(12) United States Patent
Srinivasan et al.

(10) Patent No.: US 12,293,253 B2
(45) Date of Patent: May 6, 2025

(54) MULTIPOLE FILTER ON A QUANTUM DEVICE WITH MULTIPLEXING AND SIGNAL SEPARATION

(71) Applicant: International Business Machines Corporation, Armonk, NY (US)

(72) Inventors: Srikanth Srinivasan, Mount Kisco, NY (US); John Blair, Katonah, NY (US); George Andrew Keefe, Cortlandt Manor, NY (US); Thomas George McConkey, White Plains, NY (US); Dongbing Shao, Briarcliff Manor, NY (US); Firat Solgun, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 890 days.

(21) Appl. No.: 16/997,311

(22) Filed: Aug. 19, 2020

(65) Prior Publication Data
US 2022/0058508 A1    Feb. 24, 2022

(51) Int. Cl.
*G06N 10/00*    (2022.01)
*H01P 1/203*    (2006.01)

(52) U.S. Cl.
CPC .............. *G06N 10/00* (2019.01); *H01P 1/203* (2013.01)

(58) Field of Classification Search
CPC .......... G06N 10/00; G06N 10/40; H01P 1/203
See application file for complete search history.

(56) References Cited

U.S. PATENT DOCUMENTS

| | | | |
|---|---|---|---|
| 9,344,092 B2 | 5/2016 | Abraham et al. | |
| 9,438,246 B1 | 9/2016 | Naaman | |
| 9,509,280 B1 | 11/2016 | Abdo et al. | |
| 9,729,152 B2 | 8/2017 | Bronn et al. | |
| 10,192,168 B2 | 1/2019 | Rigetti et al. | |
| 10,452,991 B1 | 10/2019 | Ganzhom et al. | |
| 10,628,753 B2 | 4/2020 | Kelly | |
| 2014/0266406 A1 | 9/2014 | Abraham et al. | |
| 2017/0177534 A1* | 6/2017 | Mohseni | H10N 69/00 |
| 2019/0229690 A1 | 7/2019 | White et al. | |

(Continued)

FOREIGN PATENT DOCUMENTS

| | | |
|---|---|---|
| CN | 109800882 | 5/2019 |
| CN | 110378482 | 10/2019 |

(Continued)

OTHER PUBLICATIONS

Bronn, Nicholas T., et al. "Broadband filters for abatement of spontaneous emission in circuit quantum electrodynamics." Applied Physics Letters 107.17 (2015). (Year: 2015).*

(Continued)

*Primary Examiner* — Markus A. Vasquez
(74) *Attorney, Agent, or Firm* — Amin, Turocy & Watson, LLP

(57) ABSTRACT

Devices and/or computer-implemented methods to facilitate a multipole filter on a quantum device with multiplexing capability and signal separation to mitigate crosstalk are provided. According to an embodiment, a device can comprise an interposer substrate comprising a readout resonator. The device can further comprise a qubit chip substrate comprising a qubit coupled to the readout resonator and to a multipole filter.

20 Claims, 10 Drawing Sheets

(56) References Cited

U.S. PATENT DOCUMENTS

| | | | |
|---|---|---|---|
| 2020/0161531 A1 | 5/2020 | Olivadese et al. | |
| 2020/0320423 A1* | 10/2020 | Kelly | G06N 10/00 |
| 2020/0364600 A1* | 11/2020 | Elsherbini | H10N 60/805 |
| 2022/0337207 A1* | 10/2022 | Naaman | H03F 19/00 |

FOREIGN PATENT DOCUMENTS

| | | |
|---|---|---|
| JP | 2018-537841 A | 12/2018 |
| WO | 2018052427 | 3/2018 |
| WO | 2019/117949 | 6/2019 |
| WO | 2019/117954 | 6/2019 |
| WO | 2019/132963 A1 | 7/2019 |
| WO | 2020/027779 A1 | 2/2020 |

OTHER PUBLICATIONS

International Search Report and Written Opinion received for PCT Application Serial No. PCT/EP2021/071887 dated Dec. 2, 2021, 16 pages.

Bronn et al., "Broadband filters for abatement of spontaneous emission in circuit quantum electrodynamics", Applied Physics Letters, American Institute of Physics, 2 Huntington Quadrangle, Melville, NY 11747, XP012201664, vol. 107, No. 17, Oct. 26, 2015, 5 pages.

Colless et al., "Cryogenic High-Frequency Readout and Control Platform for Spin Qubits", arxiv.org, Cornell University Library, 201 Olin Library Cornell University Ithaca, NY 14853, XP080552976, Nov. 28, 2011, 8 pages.

Krantz et al., "A Quantum Engineer's Guide to Superconducting Qubits", arxiv.org, Cornell University Library, 201 Olin Library Cornell University Ithaca, NY 14853, XP081168926, Apr. 13, 2019, 67 pages.

In response dated Oct. 2, 2023 to the Communication pursuant to Rules 161(1) and 162 EPC dated Mar. 29, 2023 for European Patent Application No. EP 21755487.2.

Solgun et al., "Simple Impedance Response Formulas for the Dispersive Interaction Rates in the Effective Hamiltonians of Low Anharmonicity Superconducting Qubits," IEEE Transactions on Microwave Theory and Techniques, vol. 63, Issue 3, arXiv:1712.08154 [quant-ph], Dec. 21, 2017, 20 pages.

Bronn et al., "Reducing Spontaneous Emission in Circuit Quantum Electrodynamics by a Combined Readout/Filter Technique," IEEE Transactions on Applied Superconductivity, arXiv:1504.04353 [quant-ph], Oct. 20, 2015, 9 pages.

Reed et al., "Fast Reset and Suppressing Spontaneous Emission of a Superconducting Qubit," Applied Physics Letters 96, 203110, arXiv:1003.0142 [cond-mat.mes-hall], Oct. 23, 2018, 4 pages.

Jeffrey et al., "Fast Scalable State Measurement with Superconducting Qubits," acarXiv:1401.0257v3 [quant-ph], Jan. 17, 2014, 9 pages.

Stohr et al., "Analysis, Reduction and Avoidance of Crosstalk on VLSI Chips," http://www.cecs.uci.edu/~papers/compendium94-03/papers/1998/ispd98/pdffiles/08_3.pdf, 8 pages.

Noroozian et al., "Crosstalk Reduction for Superconducting Microwave Resonator Arrays," IEEE Transactions on Microwave Theory and Techniques, vol. 60, No. 5, arXiv:1206.5571 [physics.ins-det], May 2012, 9 pages.

Rider, "Crosstalk and EMI on microwave circuit boards," Kansas State University, Thesis submitted in partial fulfillment of the requirements for the degree Master of Science, 2017, 53 pages.

Japanese Patent Office, "Notice of Reasons for Refusal", Dec. 17, 2024, Japanese Patent Application No. 2023-511670, 3 pages.

* cited by examiner

MULTIPOLE FILTER ON A QUANTUM DEVICE WITH MULTIPLEXING AND SIGNAL SEPARATION

BACKGROUND

The subject disclosure relates to a multipole filter on a quantum device, and more specifically, to a multipole filter on a quantum device with multiplexing and signal separation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate a multipole filter on a quantum device with multiplexing capability and signal separation to mitigate crosstalk are described.

According to an embodiment, a device can comprise an interposer substrate comprising a readout resonator. The device can further comprise a qubit chip substrate comprising a qubit coupled to the readout resonator and to a multipole filter.

According to another embodiment, a computer-implemented method can comprise coupling, by a system operatively coupled to a processor, a qubit formed on a qubit chip substrate to a readout resonator formed on an interposer substrate. The computer-implemented method can further comprise coupling, by the system, the qubit to a multipole filter.

According to another embodiment, a device can comprise an interposer substrate comprising readout resonators. The device can further comprise a qubit chip substrate comprising qubits coupled to: the readout resonators; a multipole filter; and a multiplex readout line formed on the interposer substrate. The qubits, the readout resonators, the multipole filter, and the multiplex readout line are separated by defined distances from drive lines formed on the interposer substrate.

DETAILED DESCRIPTION

Figure 1:
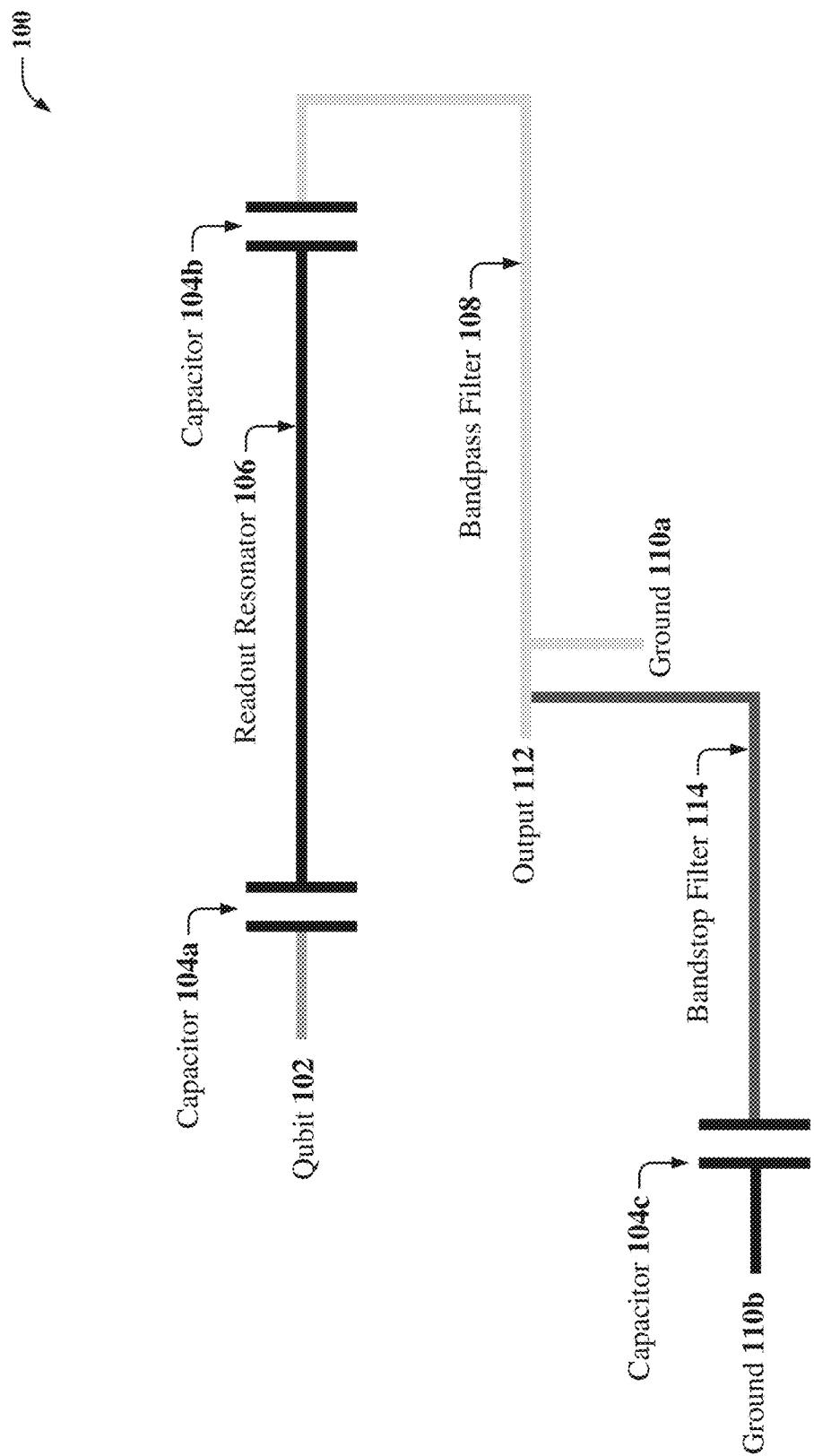
FIGS. 1, 2, and 3 illustrate circuit diagrams of example, non-limiting devices that can facilitate a multipole filter on a quantum device with multiplexing capability and signal separation to mitigate crosstalk in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element as a layer (also referred to as a film), region, and/or substrate is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present. It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling.

As referenced herein, an entity can comprise a human, a client, a user, a computing device, a software application, an agent, a machine learning model, an artificial intelligence, and/or another entity. It should be appreciated that such an entity can facilitate the design, fabrication, and/or implementation (e.g., simulation, quantizing, testing, etc.) of one or more embodiments of the subject disclosure described herein.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Qubits are coupled to resonators to enable a quantum non-demolition (QND) readout via the chi shift. The readout time is related to the full width half maximum (FWHM) of the resonator (e.g., larger FWHM leads to faster readout). The qubits' lifetime (e.g., radiative lifetime) is also related to the FWHM of the resonator (e.g., larger FWHM leads to less lifetime). Resonator frequencies are usually around 7 gigahertz (GHz), and qubit frequencies are around 5 GHz. The resonator's residual transmission at the qubit frequency is what leads to lower lifetime (e.g., radiative lifetime). This residual transmission is greater for larger FWHM.

On-chip filters (typically referred to as Purcell filters) are used on the readout chain to derive both of the favorable effects: faster readout and longer lifetime. Purcell filters allow large FWHM at the resonator frequency, while suppressing the residuals at the qubit frequency. A single resonator is a 1-pole filter, and multiple Purcell filters combined with the resonator act as a multipole filter. An additional feature of the readout chain is the ability to read multiple resonators on the same output port. This uses frequency-domain multiplexing (MUX).

FIG. 1 illustrates a circuit diagram of an example, non-limiting device 100 that can facilitate a multipole filter on a quantum device with multiplexing capability and signal separation to mitigate crosstalk in accordance with one or more embodiments described herein. Device 100 can comprise a semiconducting and/or a superconducting device that can be implemented in a quantum device. For example, device 100 can comprise an integrated semiconducting and/or superconducting circuit (e.g., a quantum circuit) that can be implemented in a quantum device such as, for instance, quantum hardware, a quantum processor, a quantum computer, and/or another quantum device. Device 100 can comprise a semiconducting and/or a superconducting device such as, for instance, a flip-chip quantum device that can be implemented in such a quantum device defined above. In some embodiments, device 100 can comprise a quantum readout device.

As illustrated in the example embodiment depicted in FIG. 1, device 100 can comprise a qubit 102 that can be capacitively coupled to a readout resonator 106, where such capacitive coupling is represented as a capacitor 104a. In this example embodiment, readout resonator 106 can be further capacitively coupled to a multipole filter (not annotated in FIG. 1) that can comprise a bandpass filter 108 and a bandstop filter 114, where such capacitive coupling is represented as a capacitor 104b. For instance, in the example embodiment illustrated in FIG. 1, readout resonator 106 can be capacitively coupled in series to bandpass filter 108 of such a multipole filter and bandpass filter 108 can be further coupled in series to bandstop filter 114 of such a multipole filter.

In the example embodiment illustrated in FIG. 1, such a multipole filter can comprise a multipole Purcell filter such as, for example, a second order Purcell filter, a higher order Purcell filter, and/or another multipole Purcell filter. In this example embodiment, bandpass filter 108 can be indicative of a single pole (e.g., a first pole) of such a multipole filter (e.g., a second order Purcell filter) and bandstop filter 114 can be indicative of another pole (e.g., a second pole) of the multipole filter.

As illustrated in the example embodiment depicted in FIG. 1, bandpass filter 108 can be further coupled to a ground 110a and/or an output 112 (e.g., an output port of device 100). In this example embodiment, bandstop filter 114 can be capacitively coupled to a ground 110b, where such capacitive coupling is represented as a capacitor 104c.

Qubit 102 illustrated in the example embodiment depicted in FIG. 1 can comprise, for instance, a transmon qubit, a fixed frequency qubit, a fixed frequency transmon qubit, a superconducting qubit, a tunable qubit, a tunable transmon qubit, and/or another qubit. Readout resonator 106 illustrated in the example embodiment depicted in FIG. 1 can comprise, for instance, a coplanar wave guide resonator.

In an embodiment, qubit 102 can have an operating frequency (e.g., resonant frequency) ranging from approximately 4.5 GHz to approximately 5.5 GHZ. In the example embodiment illustrated in FIG. 1, readout resonator 106 can operate at or approximately at an operating frequency (e.g., resonant frequency) that is higher than that of qubit 102. For instance, in an example embodiment, readout resonator 106 can operate at or approximately at an operating frequency of 7.5 GHz so as to be in the dispersive regime of a qubit frequency space (e.g., the dispersive regime of a qubit computational space comprising the $|0\rangle$ and/or $|1\rangle$ quantum states that can store quantum information). In the example embodiment depicted in FIG. 1, bandpass filter 108 can operate at or approximately at an operating frequency (e.g., resonant frequency) of readout resonator 106 (e.g., at or approximately at 7.5 GHZ) and bandstop filter 114 can operate at or approximately at an operating frequency (e.g., resonant frequency) of qubit 102 (e.g., 4.5 GHz to 5.5 GHZ). In various embodiments, such operating frequencies (e.g., resonant frequencies) of qubit 102, readout resonator 106, bandpass filter 108, and/or bandstop filter 114 can be set during design and/or fabrication of device 100.

Device 100, qubit 102, and/or readout resonator 106 can be coupled to an external device (not illustrated in the figures). For example, device 100, qubit 102, and/or readout resonator 106 can be coupled to an external device that can be external to device 100 such as, for instance, a pulse generator device and/or a microwave laser device. In an example embodiment, although not depicted in FIG. 1, device 100, qubit 102, and/or readout resonator 106 can be coupled to a pulse generator device including, but not limited to, an arbitrary waveform generator (AWG), a vector network analyzer (VNA), and/or another pulse generator device that can be external to device 100 and can transmit and/or receive pulses (e.g., microwave pulses, microwave signals, control signals, etc.) to and/or from device 100, qubit 102, and/or readout resonator 106. In another example embodiment, although not depicted in FIG. 1, device 100, qubit 102, and/or readout resonator 106 can be coupled to a microwave laser device including, but not limited to, a maser, and/or another microwave laser device that can be external to device 100 and can transmit and/or receive a laser of microwave light to and/or from device 100, qubit 102, and/or readout resonator 106.

In accordance with one or more embodiments of the subject disclosure, such an external device described above (e.g., an AWG, a VNA, a maser, etc.) can also be coupled to a computer comprising a memory that can store instructions thereon and a processor that can execute such instructions. For example, in these embodiments, such an external device described above (e.g., an AWG, a VNA, a maser, etc.) can also be coupled to a computer 1012 described below with reference to FIG. 10, where computer 1012 can comprise a system memory 1016 that can store instructions thereon (e.g., software, routines, processing threads, etc.) and a processing unit 1014 that can execute such instructions. In these embodiments, such a computer can be employed to operate and/or control (e.g., via processing unit 1014 executing instructions stored on system memory 1016) such an external device described above (e.g., an AWG, a VNA, a maser, etc.). For instance, in these embodiments, such a computer can be employed to enable the external device described above (e.g., an AWG, a VNA, a maser, etc.) to: a) transmit and/or receive pulses (e.g., microwave pulses, microwave signals, control signals, etc.) to and/or from device 100, qubit 102, and/or readout resonator 106; and/or b) transmit and/or receive a laser of microwave light to and/or from device 100, qubit 102, and/or readout resonator 106.

In the embodiments described above, such pulses and/or laser of microwave light can constitute a drive power that can be provided to a drive line of device 100 (drive line not illustrated in FIG. 1). In these embodiments, such a drive power can enable such capacitive coupling described above between the various components of device 100. For example, in these embodiments, such a drive power can enable: a) capacitive coupling of qubit 102 to readout resonator 106, where such capacitive coupling is represented in FIG. 1 by capacitor 104a; b) capacitive coupling of readout resonator 106 to bandpass filter 108, where such capacitive coupling is represented in FIG. 1 by capacitor 104b; and/or c) capacitive coupling of bandstop filter 114 to ground 110b, where such capacitive coupling is represented in FIG. 1 by capacitor 104c. In these embodiments, the capacitive coupling of qubit 102 to readout resonator 106 and the capacitive coupling of readout resonator 106 to the multipole filter comprising bandpass filter 108 and bandstop filter 114 can constitute coupling of qubit 102 to the multipole filter.

Fabrication of device 100 can comprise multi-step sequences of, for example, photolithographic and/or chemical processing steps that facilitate gradual creation of electronic-based systems, devices, components, and/or circuits in a semiconducting and/or a superconducting device (e.g., an integrated circuit). For instance, device 100 can be fabricated on one or more substrates (e.g., a silicon (Si) substrates, etc.) by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), chemical vapor deposition (CVD), atomic layer deposition (ALD), physical vapor deposition (PVD), molecular beam epitaxy (MBE), electrochemical deposition (ECD), chemical-mechanical planarization (CMP), backgrinding techniques, and/or another technique for fabricating an integrated circuit.

Device 100 can be fabricated using various materials. For example, device 100 can be fabricated using materials of one or more different material classes including, but not limited to: conductive materials, semiconducting materials, superconducting materials, dielectric materials, polymer materials, organic materials, inorganic materials, non-conductive materials, and/or another material that can be utilized with one or more of the techniques described above for fabricating an integrated circuit.

Figure 2:
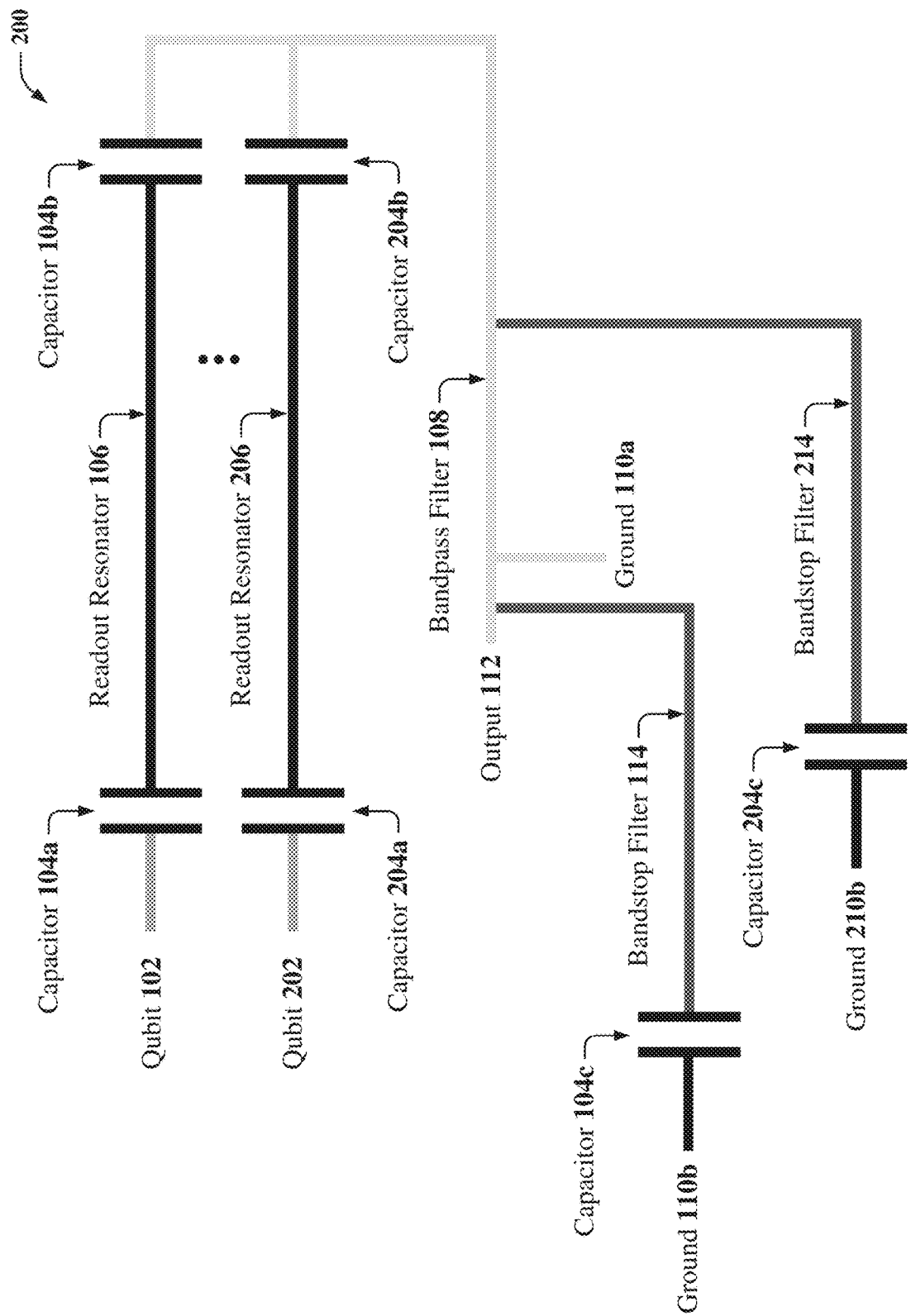

FIG. 2 illustrates a circuit diagram of an example, non-limiting device 200 that can facilitate a multipole filter on a quantum device with multiplexing capability and signal separation to mitigate crosstalk in accordance with one or more embodiments described herein. Repetitive description of like elements and/or processes employed in respective embodiments is omitted for sake of brevity.

Device 200 can comprise an example, non-limiting alternative embodiment of device 100 described above with reference to FIG. 1. Device 200 can comprise a semiconducting and/or a superconducting device that can be implemented in a quantum device. For example, device 200 can comprise an integrated semiconducting and/or superconducting circuit (e.g., a quantum circuit) that can be implemented in a quantum device such as, for instance, quantum hardware, a quantum processor, a quantum computer, and/or another quantum device. Device 200 can comprise a semiconducting and/or a superconducting device such as, for instance, a flip-chip quantum device that can be implemented in such a quantum device defined above. In some embodiments, device 200 can comprise a quantum readout device.

As illustrated in the example embodiment depicted in FIG. 2, device 200 can comprise qubit 102 and a qubit 202 that can be capacitively coupled to readout resonator 106 and a readout resonator 206, respectively, where such capacitive coupling is represented as capacitor 104a and a capacitor 204a, respectively. In this example embodiment: qubit 202 can comprise the same structure and/or functionality as that of qubit 102; readout resonator 206 can comprise the same structure and/or functionality as that of readout resonator 106; and capacitor 204a can comprise the same structure and/or functionality as that of capacitor 104a.

In the example embodiment illustrated in FIG. 2, readout resonator 106 and readout resonator 206 can each be further capacitively coupled to a multipole filter (not annotated in FIG. 2) that can comprise bandpass filter 108, bandstop filter 114, and a bandstop filter 214, where such capacitive coupling is represented as capacitor 104b and a capacitor 204b, respectively. For instance, in the example embodiment illustrated in FIG. 2, readout resonator 106 and readout resonator 206 can each be capacitively coupled in parallel to bandpass filter 108 of such a multipole filter and bandpass filter 108 can be further coupled in parallel to bandstop filter 114 and bandstop filter 214 of such a multipole filter. In the example embodiment depicted in FIG. 2, bandstop filter 214 can comprise the same structure and/or functionality as that of bandstop filter 114 and capacitor 204b can comprise the same structure and/or functionality as that of capacitor 104b.

In the example embodiment illustrated in FIG. 2, such a multipole filter can comprise a multipole Purcell filter such as, for example, a second order Purcell filter, a higher order Purcell filter, and/or another multipole Purcell filter. In this example embodiment: bandpass filter 108 can be indicative of a single pole (e.g., a first pole) of such a multipole filter (e.g., a second order Purcell filter); bandstop filter 114 can be indicative of another pole (e.g., a second pole) of the multipole filter; and/or bandstop filter 214 can be indicative of yet another pole (e.g., a third pole) of the multipole filter.

As illustrated in the example embodiment depicted in FIG. 2, bandpass filter 108 can be further coupled to ground 110a and/or output 112 (e.g., an output port of device 100). In this example embodiment, bandstop filter 114 can be capacitively coupled to ground 110b, where such capacitive coupling is represented as capacitor 104c. In this example embodiment, bandstop filter 214 can be capacitively coupled to a ground 210b, where such capacitive coupling is represented as a capacitor 204c. In the example embodiment illustrated in FIG. 2, ground 210b can comprise the same structure and/or functionality as that of ground 110b and capacitor 204c can comprise the same structure and/or functionality as that of capacitor 104c.

Although the example embodiment illustrated in FIG. 2 depicts certain quantities of certain device 200 components, for instance, two qubits (e.g., qubit 102 and qubit 202), two readout resonators (e.g., readout resonator 106 and readout resonator 206), and two bandstop filters (e.g., bandstop filter 114 and bandstop filter 214), it should be appreciated that the subject disclosure described herein is not so limiting. For example, in some embodiments, device 200 can comprise a higher quantity or a lower quantity of each of such certain device 200 components. For instance, in some embodiments, device 200 can comprise three or more qubits, readout resonators, and/or bandstop filters.

Qubit 102 and/or qubit 202 illustrated in the example embodiment depicted in FIG. 2 can comprise, for instance, a transmon qubit, a fixed frequency qubit, a fixed frequency transmon qubit, a superconducting qubit, a tunable qubit, a tunable transmon qubit, and/or another qubit. Readout resonator 106 and/or readout resonator 206 illustrated in the example embodiment depicted in FIG. 2 can comprise, for instance, a coplanar wave guide resonator.

In an embodiment, qubit 102 and qubit 202 can each have an operating frequency (e.g., resonant frequency) ranging from approximately 4.5 GHz to approximately 5.5 GHz. In the example embodiment illustrated in FIG. 2, readout resonator 106 and/or readout resonator 206 can operate at or approximately at an operating frequency (e.g., resonant frequency) that is higher than that of qubit 102 and/or qubit 202. For instance, in an example embodiment, readout resonator 106 and/or readout resonator 206 can operate at or approximately at an operating frequency of 7.5 GHz so as to be in the dispersive regime of a qubit frequency space (e.g., the dispersive regime of a qubit computational space comprising the $|0\rangle$ and/or $|1\rangle$ quantum states that can store quantum information). In the example embodiment depicted in FIG. 2, bandpass filter 108 can operate at or approximately at an operating frequency (e.g., resonant frequency) of readout resonator 106 and/or readout resonator 206 (e.g., at or approximately at 7.5 GHz). In this example embodiment, bandstop filter 114 and/or bandstop filter 214 can operate at or approximately at an operating frequency (e.g., resonant frequency) of qubit 102 and/or qubit 202 (e.g., 4.5 GHZ to 5.5 GHz). In various embodiments, such operating frequencies (e.g., resonant frequencies) of qubit 102, qubit 202, readout resonator 106, readout resonator 206, bandpass filter 108, bandstop filter 114, and/or bandstop filter 214 can be set during design and/or fabrication of device 200.

In some embodiments, bandstop filter 114 can operate at or approximately at an operating frequency (e.g., resonant frequency) of qubit 102 and bandstop filter 214 can operate at or approximately at an operating frequency (e.g., resonant frequency) of qubit 202 (e.g., 4.5 GHz to 5.5 GHZ). In these embodiments, the above described multipole filter of device 200 can comprise bandpass filter 108 and multiple bandstop filters (e.g., bandstop filter 114, bandstop filter 214, and/or another bandstop filter of device 200 that is not illustrated in FIG. 2). In these embodiments, such multiple bandstop filters (e.g., bandstop filter 114, bandstop filter 214, and/or another bandstop filter of device 200) can accommodate multiple different qubit frequency bands of multiple qubits such as, for instance, qubit 102, qubit 202, and/or another qubit of device 200 that is not illustrated in FIG. 2.

In some embodiments, bandstop filter 114 and bandstop filter 214 can both operate at or approximately at an operating frequency (e.g., resonant frequency) of qubit 102 (e.g., 4.5 GHz to 5.5 GHz). In these embodiments, the above described multipole filter of device 200 can comprise bandpass filter 108 and multiple bandstop filters (e.g., bandstop filter 114, bandstop filter 214, and/or another bandstop filter of device 200 that is not illustrated in FIG. 2). In these embodiments, such multiple bandstop filters (e.g., bandstop filter 114, bandstop filter 214, and/or another bandstop filter of device 200) can each accommodate a certain qubit frequency band of a certain qubit such as, for instance, a qubit frequency band of qubit 102, thereby enabling improved Purcell protection of qubit 102.

In some embodiments, bandstop filter 114 and bandstop filter 214 can both operate at or approximately at an operating frequency (e.g., resonant frequency) of qubit 202 (e.g., 4.5 GHz to 5.5 GHZ). In these embodiments, the above described multipole filter of device 200 can comprise bandpass filter 108 and multiple bandstop filters (e.g., bandstop filter 114, bandstop filter 214, and/or another bandstop filter of device 200 that is not illustrated in FIG. 2). In these embodiments, such multiple bandstop filters (e.g., bandstop filter 114, bandstop filter 214, and/or another bandstop filter of device 200) can each accommodate a certain qubit frequency band of a certain qubit such as, for instance, a qubit frequency band of qubit 202, thereby enabling improved Purcell protection of qubit 202.

Device 200, qubit 102, qubit 202, readout resonator 106, and/or readout resonator 206 can be coupled to an external device (not illustrated in the figures). For example, device 200, qubit 102, qubit 202, readout resonator 106, and/or readout resonator 206 can be coupled to an external device that can be external to device 200 such as, for instance, a pulse generator device and/or a microwave laser device. In an example embodiment, although not depicted in FIG. 2, device 200, qubit 102, qubit 202, readout resonator 106, and/or readout resonator 206 can be coupled to a pulse generator device including, but not limited to, an arbitrary waveform generator (AWG), a vector network analyzer (VNA), and/or another pulse generator device that can be external to device 200 and can transmit and/or receive pulses (e.g., microwave pulses, microwave signals, control signals, etc.) to and/or from device 200, qubit 102, qubit 202, readout resonator 106, and/or readout resonator 206. In another example embodiment, although not depicted in FIG. 2, device 200, qubit 102, qubit 202, readout resonator 106, and/or readout resonator 206 can be coupled to a microwave laser device including, but not limited to, a maser, and/or another microwave laser device that can be external to device 200 and can transmit and/or receive a laser of microwave light to and/or from device 200, qubit 102, qubit 202, readout resonator 106, and/or readout resonator 206.

In accordance with one or more embodiments of the subject disclosure, such an external device described above (e.g., an AWG, a VNA, a maser, etc.) can also be coupled to a computer comprising a memory that can store instructions thereon and a processor that can execute such instructions. For example, in these embodiments, such an external device described above (e.g., an AWG, a VNA, a maser, etc.) can also be coupled to a computer 1012 described below with reference to FIG. 10, where computer 1012 can comprise a system memory 1016 that can store instructions thereon (e.g., software, routines, processing threads, etc.) and a processing unit 1014 that can execute such instructions. In these embodiments, such a computer can be employed to operate and/or control (e.g., via processing unit 1014 executing instructions stored on system memory 1016) such an external device described above (e.g., an AWG, a VNA, a maser, etc.). For instance, in these embodiments, such a computer can be employed to enable the external device described above (e.g., an AWG, a VNA, a maser, etc.) to: a) transmit and/or receive pulses (e.g., microwave pulses, microwave signals, control signals, etc.) to and/or from device 200, qubit 102, qubit 202, readout resonator 106, and/or readout resonator 206; and/or b) transmit and/or receive a laser of microwave light to and/or from device 200, qubit 102, qubit 202, readout resonator 106, and/or readout resonator 206.

In the embodiments described above, such pulses and/or laser of microwave light can constitute a drive power that can be provided to a drive line of device 200 (drive line not illustrated in FIG. 2). In these embodiments, such a drive power can enable such capacitive coupling described above between the various components of device 200. For example, in these embodiments, such a drive power can enable: a) capacitive coupling of qubit 102 and qubit 202 to readout resonator 106 and readout resonator 206, respectively, where such capacitive coupling is represented in FIG. 2 by capacitor 104a and capacitor 204a, respectively; b) capacitive coupling of readout resonator 106 and readout resonator 206 to bandpass filter 108, where such capacitive coupling is represented in FIG. 2 by capacitor 104b and capacitor 204b, respectively; and/or c) capacitive coupling of bandstop filter 114 and bandstop filter 214 to ground 110b and ground 210b, respectively, where such capacitive coupling is represented in FIG. 2 by capacitor 104c and capacitor 204c, respectively. In these embodiments, the capacitive coupling of qubit 102 to readout resonator 106 and the capacitive coupling of readout resonator 106 to the multipole filter comprising bandpass filter 108, bandstop filter 114, and bandstop filter 214 can constitute coupling of qubit 102 to the multipole filter. In these embodiments, the capacitive coupling of qubit 202 to readout resonator 206 and the capacitive coupling of readout resonator 206 to the multipole filter comprising bandpass filter 108, bandstop filter 114, and bandstop filter 214 can constitute coupling of qubit 202 to the multipole filter.

Fabrication of device 200 can comprise multi-step sequences of, for example, photolithographic and/or chemical processing steps that facilitate gradual creation of electronic-based systems, devices, components, and/or circuits in a semiconducting and/or a superconducting device (e.g., an integrated circuit). For instance, device 200 can be fabricated on one or more substrates (e.g., a silicon (Si) substrates, etc.) by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), chemical vapor deposition (CVD), atomic layer deposition (ALD), physical vapor deposition (PVD), molecular beam epitaxy (MBE), electrochemical deposition (ECD), chemical-mechanical planarization (CMP), backgrinding techniques, and/or another technique for fabricating an integrated circuit.

Device 200 can be fabricated using various materials. For example, device 200 can be fabricated using materials of one or more different material classes including, but not limited to: conductive materials, semiconducting materials, superconducting materials, dielectric materials, polymer materials, organic materials, inorganic materials, non-conductive materials, and/or another material that can be utilized with one or more of the techniques described above for fabricating an integrated circuit.

Figure 3:
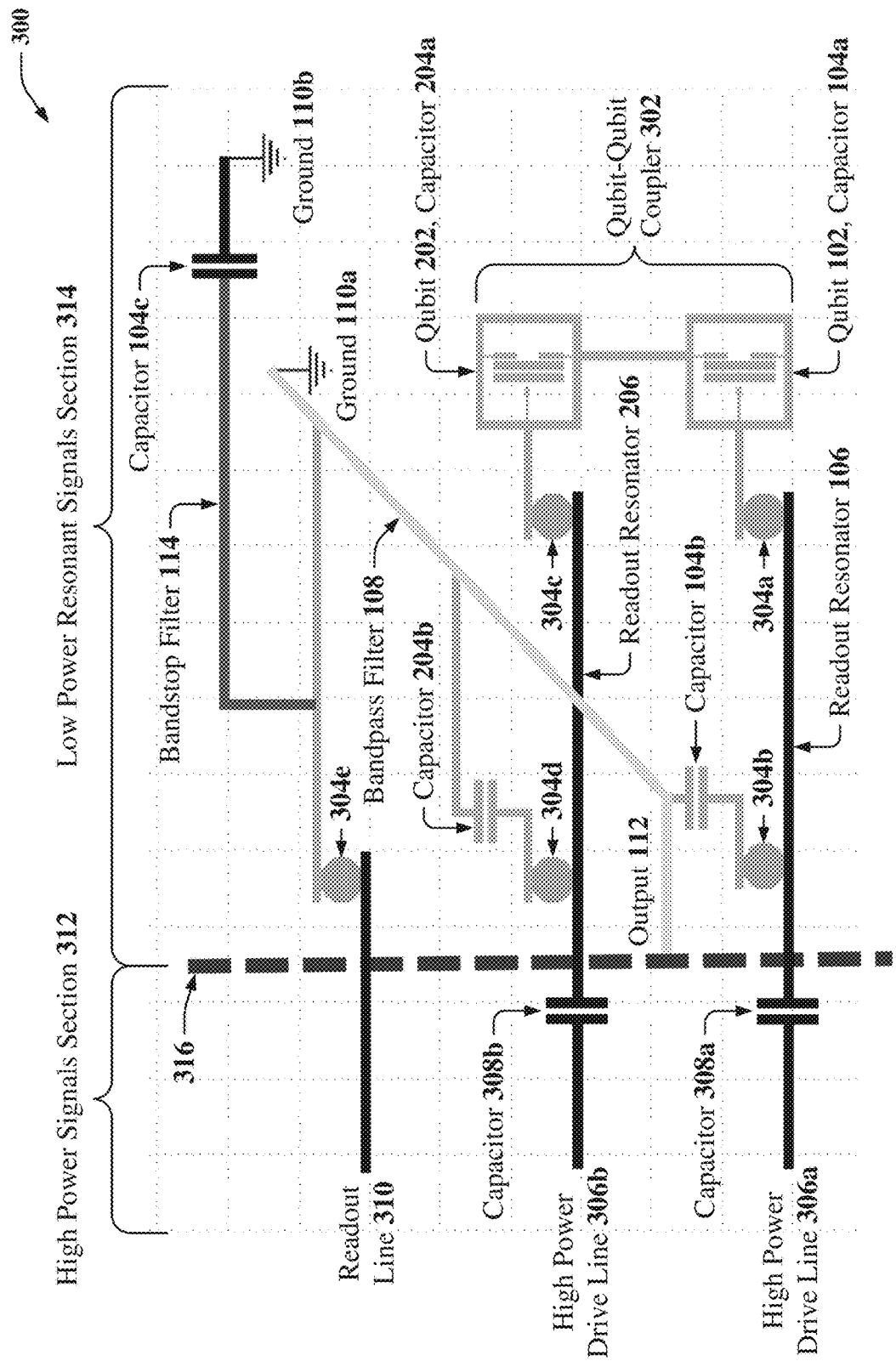

FIG. 3 illustrates a circuit diagram of an example, non-limiting device 300 that can facilitate a multipole filter on a quantum device with multiplexing capability and signal separation to mitigate crosstalk in accordance with one or more embodiments described herein. Repetitive description of like elements and/or processes employed in respective embodiments is omitted for sake of brevity.

Device 300 can comprise an example, non-limiting alternative embodiment of device 100 and/or device 200 described above with reference to FIGS. 1 and 2, respectively. Device 300 can comprise a semiconducting and/or a superconducting device that can be implemented in a quantum device. For example, device 300 can comprise an integrated semiconducting and/or superconducting circuit (e.g., a quantum circuit) that can be implemented in a quantum device such as, for instance, quantum hardware, a quantum processor, a quantum computer, and/or another quantum device. Device 300 can comprise a semiconducting and/or a superconducting device such as, for instance, a flip-chip quantum device that can be implemented in such a quantum device defined above. In some embodiments, device 300 can comprise a quantum readout device.

As illustrated in the example embodiment depicted in FIG. 3, device 300 can comprise qubit 102 and qubit 202 that can be coupled (e.g., capacitively coupled) to each other to form a qubit-qubit coupler 302. In some embodiments, qubit-qubit coupler 302 can be implemented to perform a quantum gate operation (e.g., a cross-resonance gate operation, etc.). In some embodiments, qubit-qubit coupler 302 can comprise, for instance, a two junction qubit, a fixed frequency coupler, a multimode two junction coupler, a flux tunable coupler, a tunable coupler qubit, a flux tunable coupler qubit, a tunable qubit, a tunable bus, or a flux tunable qubit bus, and/or another tunable coupler that can perform a quantum gate operation.

In the example embodiment illustrated in FIG. 3, qubit 102 and qubit 202 can be respectively coupled to readout resonator 106 and readout resonator 206 via a bump bond 304a and a bump bond 304c, respectively. In this example embodiment, readout resonator 106 can be further coupled via a bump bond 304b and a capacitive coupling represented as capacitor 104b to a multipole filter (not annotated in FIG. 3) that can comprise bandpass filter 108 and bandstop filter 114. In this example embodiment, readout resonator 206 can be further coupled via a bump bond 304d and a capacitive coupling represented as capacitor 204b to the above described multipole filter (not annotated in FIG. 3) that can comprise bandpass filter 108 and bandstop filter 114. For instance, in the example embodiment illustrated in FIG. 3, readout resonator 106 and readout resonator 206 can each be capacitively coupled in parallel to bandpass filter 108 of such a multipole filter and bandpass filter 108 can be further coupled in series to bandstop filter 114 of such a multipole filter.

In the example embodiment illustrated in FIG. 3, such a multipole filter can comprise a multipole Purcell filter such as, for example, a second order Purcell filter, a higher order Purcell filter, and/or another multipole Purcell filter. In this example embodiment, bandpass filter 108 can be indicative of a single pole (e.g., a first pole) of such a multipole filter (e.g., a second order Purcell filter) and bandstop filter 114 can be indicative of another pole (e.g., a second pole) of the multipole filter.

As illustrated in the example embodiment depicted in FIG. 3, bandpass filter 108 can be further coupled to ground 110a and/or output 112 (e.g., an output port of device 300). In this example embodiment, bandstop filter 114 can be capacitively coupled to ground 110b, where such capacitive coupling is represented as capacitor 104c.

Although the example embodiment illustrated in FIG. 3 depicts certain quantities of certain device 300 components, for instance, two qubits (e.g., qubit 102 and qubit 202), two readout resonators (e.g., readout resonator 106 and readout resonator 206), and one bandstop filter (e.g., bandstop filter 114), it should be appreciated that the subject disclosure described herein is not so limiting. For example, in some embodiments, device 300 can comprise a higher quantity or a lower quantity of each of such certain device 300 components. For instance, in some embodiments, device 300 can comprise three or more qubits and/or readout resonators. In another example, device 300 can comprise two or more bandstop filters.

Qubit 102 and/or qubit 202 illustrated in the example embodiment depicted in FIG. 3 can comprise, for instance, a transmon qubit, a fixed frequency qubit, a fixed frequency transmon qubit, a superconducting qubit, a tunable qubit, a tunable transmon qubit, and/or another qubit. Readout resonator 106 illustrated in the example embodiment depicted in FIG. 3 can comprise, for instance, a coplanar wave guide resonator.

In an embodiment, qubit 102 and qubit 202 can each have an operating frequency (e.g., resonant frequency) ranging from approximately 4.5 GHz to approximately 5.5 GHZ. In the example embodiment illustrated in FIG. 3, readout resonator 106 and/or readout resonator 206 can operate at or approximately at an operating frequency (e.g., resonant frequency) that is higher than that of qubit 102 and/or qubit 202. For instance, in an example embodiment, readout resonator 106 and/or readout resonator 206 can operate at or approximately at an operating frequency of 7.5 GHz so as to be in the dispersive regime of a qubit frequency space (e.g., the dispersive regime of a qubit computational space comprising the $|0\rangle$ and/or $|1\rangle$ quantum states that can store quantum information). In the example embodiment depicted in FIG. 3, bandpass filter 108 can operate at or approximately at an operating frequency (e.g., resonant frequency) of readout resonator 106 and/or readout resonator 206 (e.g., at or approximately at 7.5 GHZ). In this example embodiment, bandstop filter 114 can operate at or approximately at an operating frequency (e.g., resonant frequency) of qubit 102 and/or qubit 202 (e.g., 4.5 GHz to 5.5 GHZ). In various embodiments, such operating frequencies (e.g., resonant frequencies) of qubit 102, qubit 202, readout resonator 106, readout resonator 206, bandpass filter 108, and/or bandstop filter 114 can be set during design and/or fabrication of device 300.

In the example embodiment illustrated in FIG. 3, device 300 can further comprise a high power drive line 306a and/or a high power drive line 306b. In this example embodiment, high power drive line 306a and high power drive line 306b can be capacitively coupled to readout resonator 106 and readout resonator 206, respectively, where such capacitive coupling is represented as a capacitor 308a and a capacitor 308b, respectively. In this example embodiment, the above described multipole filter that can comprise bandpass filter 108 and bandstop filter 114 can be coupled via a bump bond 304e to a readout line 310. For instance, in this example embodiment, bandpass filter 108 and bandstop filter 114 can be coupled via bump bond 304e to readout line 310. In the example embodiment depicted in FIG. 3, high power drive line 306a, a high power drive line 306b, and/or readout line 310 can comprise, for instance, wire traces that can enable device 300 and/or one or more components thereof to transmit and/or receive pulses (e.g., microwave pulses, microwave signals, control signals, etc.) and/or a laser of microwave light. In this example embodiment, readout line 310 can comprise a multiplexing readout line that can enable the reading of multiple resonators of device 300 (e.g., readout resonator 106, readout resonator 206, and/or another readout resonator of device 300 that is not illustrated in FIG. 3) using the same output port (e.g., using readout line 310 and frequency-domain multiplexing).

Device 300, high power drive line 306a, high power drive line 306b, and/or readout line 310 can be coupled to an external device (not illustrated in the figures). For example, device 300, high power drive line 306a, high power drive line 306b, and/or readout line 310 can be coupled to an external device that can be external to device 300 such as, for instance, a pulse generator device and/or a microwave laser device. In an example embodiment, although not depicted in FIG. 3, device 300, high power drive line 306a, high power drive line 306b, and/or readout line 310 can be coupled to a pulse generator device including, but not limited to, an arbitrary waveform generator (AWG), a vector network analyzer (VNA), and/or another pulse generator device that can be external to device 300 and can transmit and/or receive pulses (e.g., microwave pulses, microwave signals, control signals, etc.) to and/or from device 300, high power drive line 306a, high power drive line 306b, and/or readout line 310. In another example embodiment, although not depicted in FIG. 3, device 300, high power drive line 306a, high power drive line 306b, and/or readout line 310 can be coupled to a microwave laser device including, but not limited to, a maser, and/or another microwave laser device that can be external to device 300 and can transmit and/or receive a laser of microwave light to and/or from device 300, high power drive line 306a, high power drive line 306b, and/or readout line 310.

In accordance with one or more embodiments of the subject disclosure, such an external device described above (e.g., an AWG, a VNA, a maser, etc.) can also be coupled to a computer comprising a memory that can store instructions thereon and a processor that can execute such instructions. For example, in these embodiments, such an external device described above (e.g., an AWG, a VNA, a maser, etc.) can also be coupled to a computer 1012 described below with reference to FIG. 10, where computer 1012 can comprise a system memory 1016 that can store instructions thereon (e.g., software, routines, processing threads, etc.) and a processing unit 1014 that can execute such instructions. In these embodiments, such a computer can be employed to operate and/or control (e.g., via processing unit 1014 executing instructions stored on system memory 1016) such an external device described above (e.g., an AWG, a VNA, a maser, etc.). For instance, in these embodiments, such a computer can be employed to enable the external device described above (e.g., an AWG, a VNA, a maser, etc.) to: a) transmit and/or receive pulses (e.g., microwave pulses, microwave signals, control signals, etc.) to and/or from device 300, high power drive line 306a, high power drive line 306b, and/or readout line 310; and/or b) transmit and/or receive a laser of microwave light to and/or from device 300, high power drive line 306a, high power drive line 306b, and/or readout line 310.

In the embodiments described above, such pulses and/or laser of microwave light can constitute a drive power that can be provided to high power drive line 306a and/or high power drive line 306b. In these embodiments, such a drive power can enable such capacitive coupling described above between the various components of device 300. For example, in these embodiments, such a drive power can enable: a) capacitive coupling of qubit 102 and qubit 202 to readout resonator 106 and readout resonator 206, respectively, where such capacitive coupling is represented in FIG. 3 by capacitor 104a and capacitor 204a, respectively; b) capacitive coupling of readout resonator 106 and readout resonator 206 to bandpass filter 108, where such capacitive coupling is represented in FIG. 3 by capacitor 104b and capacitor 204b, respectively; and/or c) capacitive coupling of bandstop filter 114 to ground 110b, where such capacitive coupling is represented in FIG. 3 by capacitor 104c. In these embodiments, the capacitive coupling of qubit 102 to readout resonator 106 and the capacitive coupling of readout resonator 106 to the multipole filter comprising bandpass filter 108 and bandstop filter 114 can constitute coupling of qubit 102 to the multipole filter. In these embodiments, the capacitive coupling of qubit 202 to readout resonator 206 and the capacitive coupling of readout resonator 206 to the multipole filter comprising bandpass filter 108 and bandstop filter 114 can constitute coupling of qubit 202 to the multipole filter.

As illustrated in the example embodiment depicted in FIG. 3, device 300 can further comprise a high power signals section 312 and a low power resonant signals section 314 that can be separated from each other (e.g., physically, spatially, vertically, laterally, etc.) as represented by dashed line 316 in FIG. 3. In this example embodiment, the components of device 300 that can be positioned in low power resonant signals section 314 can function using relatively low power resonant signals, while the components of device 300 that can be positioned in high power signals section 312 can function using relatively high power signals. For example, qubit 102, qubit 202, qubit-qubit coupler 302, readout resonator 106, readout resonator 206, bandpass filter 108, bandstop filter 114, and/or another component of device 300 that can be positioned in low power resonant signals section 314 can function using relatively low power resonant signals. In another example, high power drive line 306a, high power drive line 306b, readout line 310, and/or another component of device 300 that can be positioned in high power signals section 312 can function using relatively high power signals.

In the example embodiment illustrated in FIG. 3, it should be appreciated that separation of such device 300 components in high power signals section 312 from those in low power resonant signals section 314 (e.g., as represented visually by dashed line 316 in FIG. 3) can mitigate crosstalk associated with device 300 and/or one or more components thereof. In this example embodiment, it should be further appreciated that such mitigated crosstalk associated with device 300 and/or one or more components thereof can thereby facilitate improved accuracy, improved performance, and/or improved fidelity of a processing unit comprising device 300. In this example embodiment, to facilitate such mitigated crosstalk associated with device 300, the components of device 300 that can be positioned in low power resonant signals section 314 can be separated by defined distances from the components of device 300 that can be positioned in high power signals section 312. For example, qubit 102, qubit 202, qubit-qubit coupler 302, readout resonator 106, readout resonator 206, bandpass filter 108, bandstop filter 114 and/or readout line 310 can each be respectively separated by defined distances from each other and/or from high power drive line 306a and/or high power drive line 306b.

In the above example, such defined distances can be defined distances that extend in any dimension, any plane, and/or any direction (e.g., vertical, lateral, etc.) with respect to device 300. In this example, such defined distances can be set (e.g., defined) by an entity as defined herein that can design, fabricate, and/or implement device 300. In this example, such an entity can set the defined distances such that crosstalk associated with device 300 is mitigated to a level that is acceptable to such an entity. For instance, such an entity can design and/or fabricate device 300 such that a certain layout (e.g., circuit architecture) and/or configuration of device 300 and/or one or more components thereof (e.g., qubit 102, qubit 202, qubit-qubit coupler 302, readout resonator 106, readout resonator 206, bandpass filter 108, bandstop filter 114, readout line 310, etc.) can mitigate crosstalk associated with device 300 to a level that is acceptable to such an entity. In some embodiments, all components of device 300 can be formed on a single substrate. In some embodiments, some components of device 300 can be formed on one substrate (e.g., one or more components of device 300 that can be positioned in high power signals section 312) and the other components of device 300 can be formed on another substrate (e.g., one or more components of device 300 that can be positioned in low power resonant signals section 314). In these embodiments, such substrates and/or components thereof can be coupled to one another via one or more bump bonds such as, for instance, bump bonds 304a, 304b, 304c, 304d, 304e.

Fabrication of device 300 can comprise multi-step sequences of, for example, photolithographic and/or chemical processing steps that facilitate gradual creation of electronic-based systems, devices, components, and/or circuits in a semiconducting and/or a superconducting device (e.g., an integrated circuit). For instance, device 300 can be fabricated on one or more substrates (e.g., a silicon (Si) substrates, etc.) by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), chemical vapor deposition (CVD), atomic layer deposition (ALD), physical vapor deposition (PVD), molecular beam epitaxy (MBE), electrochemical deposition (ECD), chemical-mechanical planarization (CMP), backgrinding techniques, and/or another technique for fabricating an integrated circuit.

Device 300 can be fabricated using various materials. For example, device 300 can be fabricated using materials of one or more different material classes including, but not limited to: conductive materials, semiconducting materials, superconducting materials, dielectric materials, polymer materials, organic materials, inorganic materials, non-conductive materials, and/or another material that can be utilized with one or more of the techniques described above for fabricating an integrated circuit.

Figure 4:
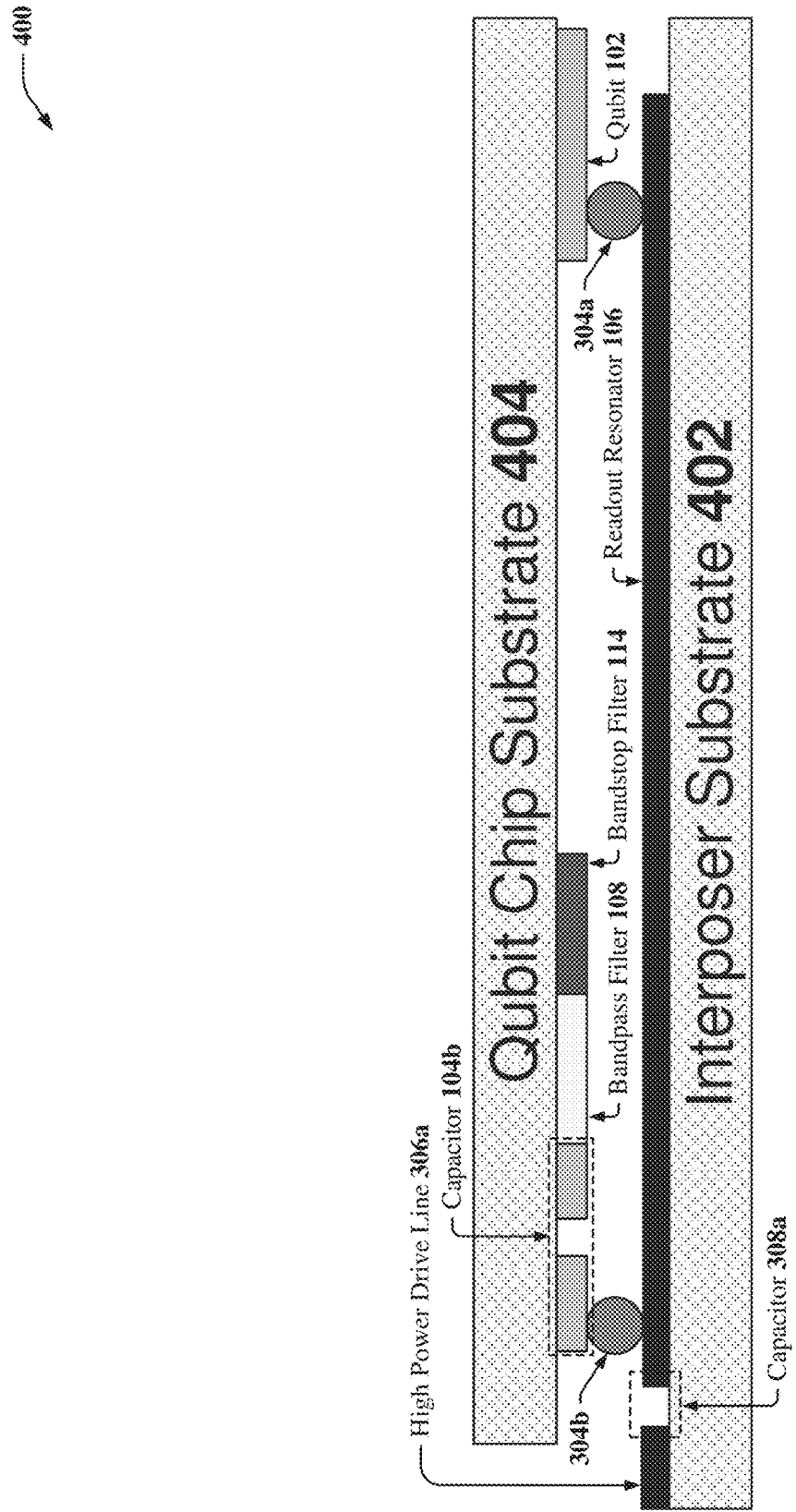
FIG. 4 illustrates a cross-sectional view of an example, non-limiting device that can facilitate a multipole filter on a quantum device with multiplexing capability and signal separation to mitigate crosstalk in accordance with one or more embodiments described herein.

FIG. 4 illustrates a cross-sectional view of an example, non-limiting device 400 that can facilitate a multipole filter on a quantum device with multiplexing capability and signal separation to mitigate crosstalk in accordance with one or more embodiments described herein. Repetitive description of like elements and/or processes employed in respective embodiments is omitted for sake of brevity.

Device 400 can comprise the same structure and/or functionality as that of device 300 described above with reference to FIG. 3. Device 400 can comprise a fabricated embodiment of device 300 that has been implemented as a semiconducting and/or superconducting device, where FIG. 4 illustrates a cross-sectional view of such a semiconducting and/or superconducting device. Device 400 can comprise a semiconducting and/or a superconducting device such as, for instance, a flip-chip quantum device that can be implemented in a quantum device such as, for instance, quantum hardware, a quantum processor, a quantum computer, and/or another quantum device. In some embodiments, device 400 can comprise a quantum readout device.

As illustrated in the example embodiment depicted in FIG. 4, device 400 can comprise an interposer substrate 402 having readout resonator 106, high power drive line 306a, and capacitor 308a formed thereon. Although not illustrated in the cross-sectional view of the example embodiment depicted in FIG. 4, interposer substrate 402 can further comprise one or more other components of device 300 described above with reference to FIG. 3. For example, in some embodiments, interposer substrate 402 can further comprise readout resonator 206, high power drive line 306b, capacitor 308b, readout line 310, qubit 102, qubit 202, capacitor 104a, capacitor 204a, qubit-qubit coupler 302, and/or another component of device 300.

In the example embodiment illustrated in FIG. 4, device 400 can further comprise a qubit chip substrate 404 having qubit 102, capacitor 104b, bandpass filter 108, and/or bandstop filter 114 formed thereon. Although not illustrated in the cross-sectional view of the example embodiment depicted in FIG. 4, qubit chip substrate 404 can further comprise one or more other components of device 300 described above with reference to FIG. 3. For example, in some embodiments, qubit chip substrate 404 can further comprise qubit 202, capacitor 104a, capacitor 204a, capacitor 204b, capacitor 104c, ground 110a, ground 110b, qubit-qubit coupler 302, readout line 310, and/or another component of device 300.

As described above and illustrated in the example embodiments depicted in FIGS. 3 and 4, interposer substrate 402 and qubit chip substrate 404, and/or one or more components thereof, can be coupled to one another via one or more bump bonds. For instance, in the example embodiments illustrated in FIGS. 3 and 4, interposer substrate 402 and qubit chip substrate 404, and/or one or more components thereof, can be coupled to one another via bump bonds 304a, 304b, 304c, 304d, and/or 304e.

With reference to device 300 and FIG. 3, in the example embodiment illustrated in FIG. 4, to mitigate crosstalk associated with device 400, various components of device 400 can be positioned in low power resonant signals section 314 (not annotated in FIG. 4) of device 400 such that they are separated by defined distances from other components of device 400 that can be positioned in high power signals section 312 (not annotated in FIG. 4) of device 400. For example, qubit 102, qubit 202, qubit-qubit coupler 302, readout resonator 106, readout resonator 206, bandpass filter 108, bandstop filter 114 and/or readout line 310 can each be respectively separated by defined distances from each other and/or from high power drive line 306a and/or high power drive line 306b.

In the above example, such defined distances can be defined distances that extend in any dimension, any plane, and/or any direction (e.g., vertical, lateral, etc.) with respect to device 400. In this example, such defined distances can be set (e.g., defined) by an entity as defined herein that can design, fabricate, and/or implement device 400. In this example, such an entity can set the defined distances such that crosstalk associated with device 400 is mitigated to a level that is acceptable to such an entity. For instance, such an entity can design and/or fabricate device 400 such that a certain layout (e.g., circuit architecture) and/or configuration of device 400 and/or one or more components thereof (e.g., qubit 102, qubit 202, qubit-qubit coupler 302, readout resonator 106, readout resonator 206, bandpass filter 108, bandstop filter 114, readout line 310, etc.) can mitigate crosstalk associated with device 400 to a level that is acceptable to such an entity.

Although the above described multipole filter comprising bandpass filter 108 and bandstop filter 114 is depicted in the example embodiment illustrated in FIG. 4 as being positioned on qubit chip substrate 404, it should be appreciated that the subject disclosure described herein is not so limiting. For example, in some embodiments, the above described multipole filter comprising bandpass filter 108 and bandstop filter 114 can be formed on interposer substrate 402.

Fabrication of device 400 can comprise multi-step sequences of, for example, photolithographic and/or chemical processing steps that facilitate gradual creation of electronic-based systems, devices, components, and/or circuits in a semiconducting and/or a superconducting device (e.g., an integrated circuit). For instance, device 400 can be fabricated on one or more substrates (e.g., a silicon (Si) substrates, etc.) by employing techniques including, but not limited to: photolithography, microlithography, nanolithography, nanoimprint lithography, photomasking techniques, patterning techniques, photoresist techniques (e.g., positive-tone photoresist, negative-tone photoresist, hybrid-tone photoresist, etc.), etching techniques (e.g., reactive ion etching (RIE), dry etching, wet etching, ion beam etching, plasma etching, laser ablation, etc.), evaporation techniques, sputtering techniques, plasma ashing techniques, thermal treatments (e.g., rapid thermal anneal, furnace anneals, thermal oxidation, etc.), chemical vapor deposition (CVD), atomic layer deposition (ALD), physical vapor deposition (PVD), molecular beam epitaxy (MBE), electrochemical deposition (ECD), chemical-mechanical planarization (CMP), backgrinding techniques, and/or another technique for fabricating an integrated circuit.

Device 400 can be fabricated using various materials. For example, device 400 can be fabricated using materials of one or more different material classes including, but not limited to: conductive materials, semiconducting materials, superconducting materials, dielectric materials, polymer materials, organic materials, inorganic materials, non-conductive materials, and/or another material that can be utilized with one or more of the techniques described above for fabricating an integrated circuit.

Figure 5:
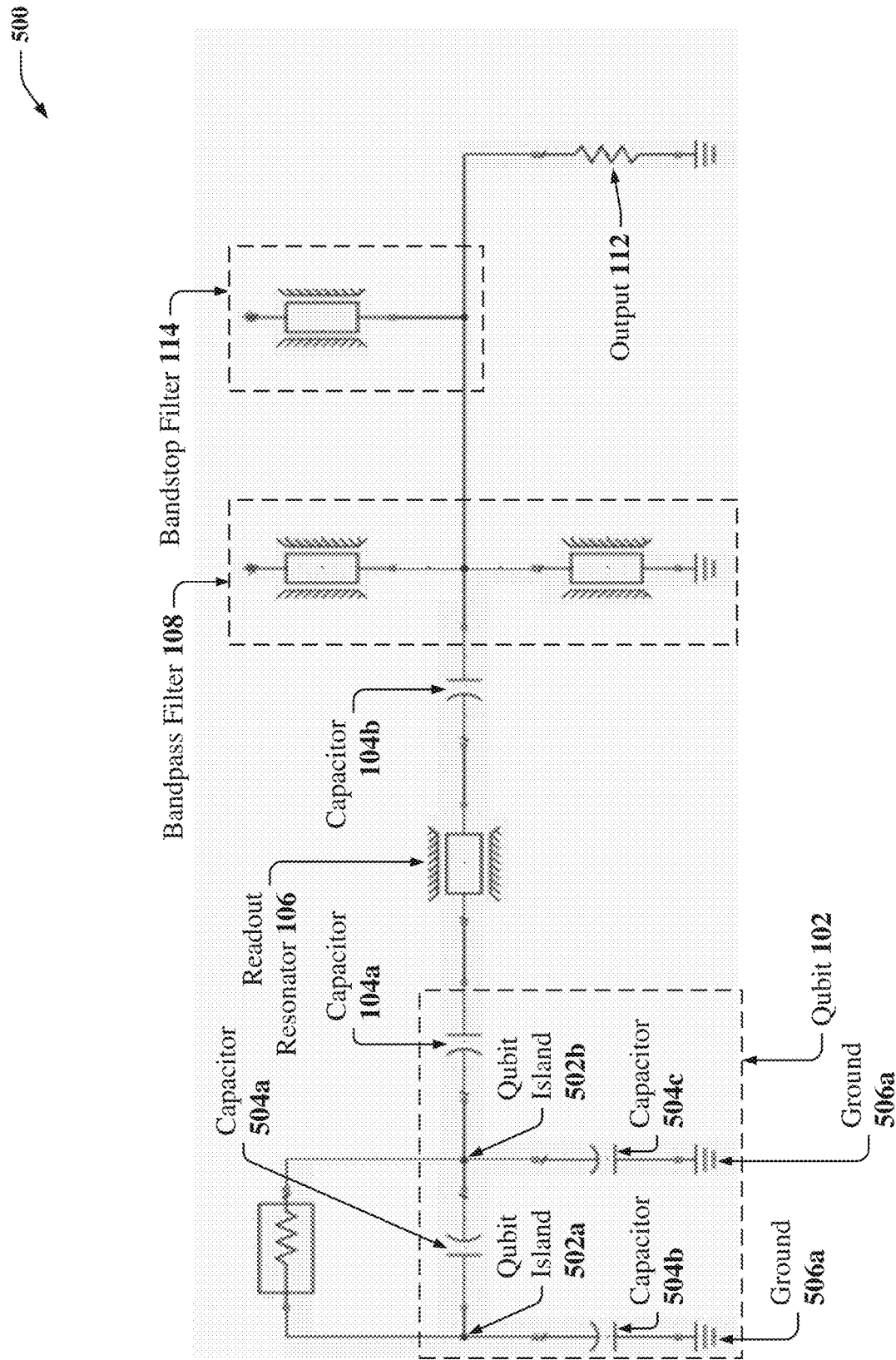
FIG. 5 illustrates an example, non-limiting circuit diagram that can facilitate a multipole filter on a quantum device with multiplexing capability and signal separation to mitigate crosstalk in accordance with one or more embodiments described herein.

FIG. 5 illustrates an example, non-limiting circuit diagram 500 that can facilitate a multipole filter on a quantum device with multiplexing capability and signal separation to mitigate crosstalk in accordance with one or more embodiments described herein. Repetitive description of like elements and/or processes employed in respective embodiments is omitted for sake of brevity.

Circuit diagram 500 can comprise a circuit diagram representing device 100 described above with reference to FIG. 1. Circuit diagram 500 can comprise an example, non-limiting alternative circuit diagram of the circuit diagram illustrated in FIG. 1 representing device 100. Circuit diagram 500 can be generated using a quantum-based simulation software application that can be used to simulate the operation of a superconducting device such as, for instance, device 100.

As illustrated in the example embodiment depicted in FIG. 5, qubit 102 can comprise qubit island 502a and qubit island 502b. In this example embodiment, qubit island 502a and qubit island 502b can be capacitively coupled to one another, where such capacitive coupling is represented as a capacitor 504a in FIG. 5. In this example embodiment, qubit island 502a can be capacitively coupled to a ground 506a, where such capacitive coupling is represented as a capacitor 504b in FIG. 5. In this example embodiment, qubit island 502b can be capacitively coupled to a ground 506b, where such capacitive coupling is represented as a capacitor 504c in FIG. 5.

In the example embodiment depicted in FIG. 5, output 112 can comprise a transmission line (e.g., a wire trace) that can be represented as a resistor. For instance, in some embodiments, output 112 can comprise a transmission line (e.g., a wire trace) that can be represented as a 50 Ohm ($\Omega$) resistor.

In some embodiments, an entity as defined herein that can design, fabricate, and/or implement (e.g., simulate, quantizing, test, etc.) device 100 can employ a quantum-based simulation software application to generate circuit diagram 500. In these embodiments, such an entity can further employ such a quantum-based simulation software application to simulate operation of device 100 using circuit diagram 500. For instance, such an entity can employ such a quantum-based simulation software application to simulate operation of device 100 using circuit diagram 500, where results data of such a simulation can be rendered as plot 606 of graph 600 described below with reference to FIG. 6.

Figure 6:
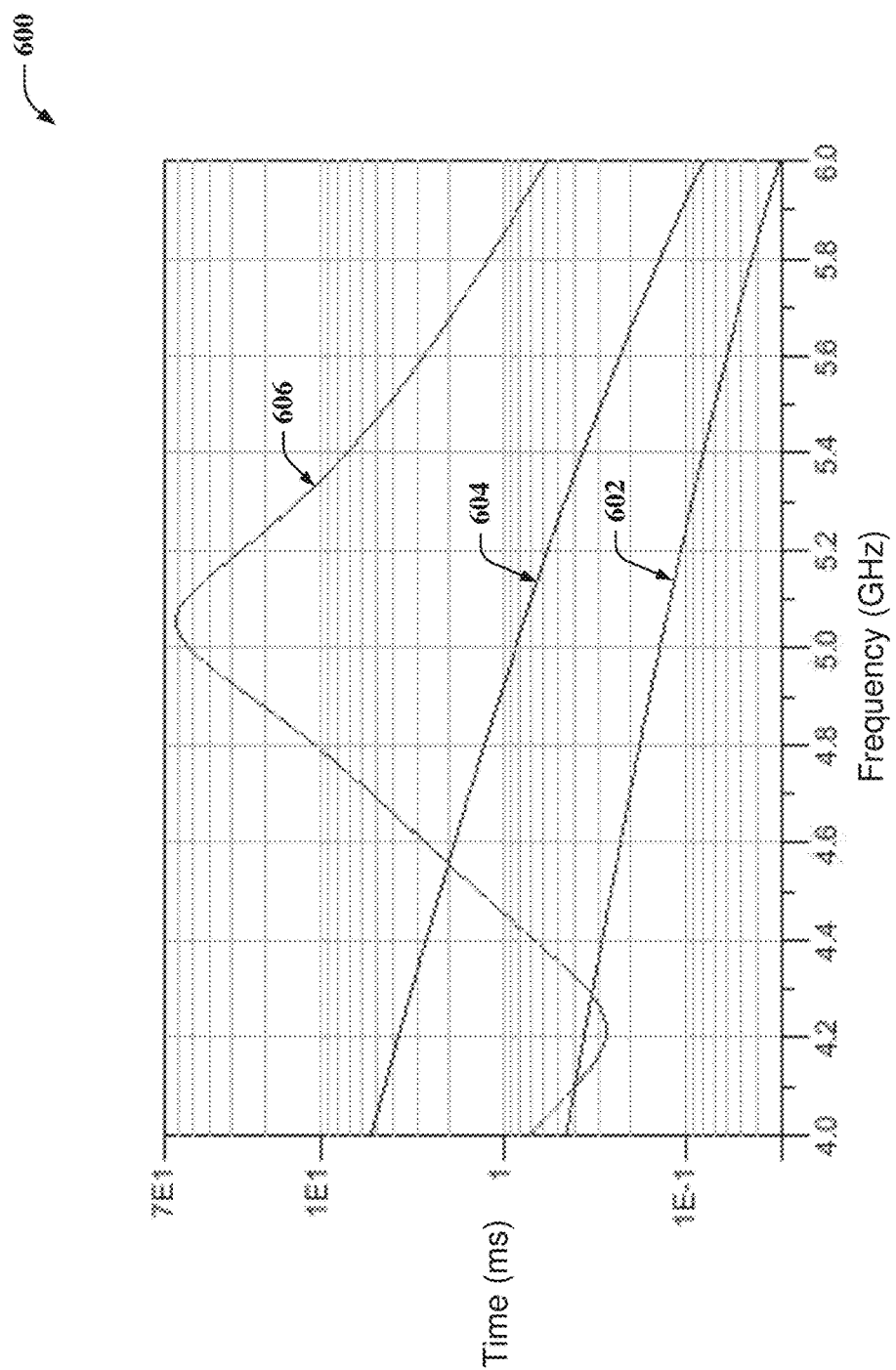
FIG. 6 illustrates an example, non-limiting graph that can facilitate a multipole filter on a quantum device with multiplexing capability and signal separation to mitigate crosstalk in accordance with one or more embodiments described herein.

FIG. 6 illustrates an example, non-limiting graph 600 that can facilitate a multipole filter on a quantum device with multiplexing capability and signal separation to mitigate crosstalk in accordance with one or more embodiments described herein. Repetitive description of like elements and/or processes employed in respective embodiments is omitted for sake of brevity.

Graph 600 can comprise results data yielded from implementing (e.g., simulating, quantizing, testing, etc.) one or more embodiments of the subject disclosure described herein. For example, graph 600 can comprise results data yielded from simulating device 100 using circuit diagram 500 as described above with reference to FIGS. 1 and 5 and/or in accordance with one or more other embodiments of the subject disclosure described herein (e.g., in accordance with computer-implemented methods 800 and/or 900 described below with reference to FIGS. 8 and 9, respectively). In the example, non-limiting graph 600 depicted in FIG. 6, such results data described above can be rendered on graph 600 as plot 606, where, for purposes of comparison, plot 602 and plot 604 of graph 600 comprise results data yielded from implementing two existing art devices.

Plot 602, plot 604, and plot 606 illustrated in the example, non-limiting graph 600 depicted in FIG. 6 represent results data generated by simulating operation of device 100 and two prior art devices, respectively, where all of such devices have been simulated using the same cavity FWHM and 7.5 GHz resonance to yield the same readout time. Plot 602, plot 604, and plot 606 illustrated in the example, non-limiting graph 600 depicted in FIG. 6 show the radiative lifetime (e.g., the Purcell relaxation) of a qubit in each of the devices simulated to generate such plots. For example, plot 606 illustrates the radiative lifetime of qubit 102 in device 100. Plot 602, plot 604, and plot 606 illustrate the radiative lifetime of such qubits as a function of frequency expressed in GHz in the X-axis of graph 600 and time expressed in milliseconds (ms) in the Y-axis of graph 600.

In the example, non-limiting graph 600 depicted in FIG. 6, plot 602 illustrates the radiative lifetime of a qubit in a first prior art device, where such a qubit is filtered using a single $\lambda/2$ readout resonator (e.g., a single $\lambda/2$ readout cavity) having an operating frequency (e.g., resonant frequency) of 7.5 GHz.

In the example, non-limiting graph 600 depicted in FIG. 6, plot 604 illustrates the radiative lifetime of a qubit in a second prior art device, where such a qubit is filtered using a single $\lambda/2$ readout resonator (e.g., a single $\lambda/2$ readout cavity) having an operating frequency (e.g., resonant frequency) of 7.5 GHz and a $\lambda/4$ bandpass filter also having an operating frequency of 7.5 GHz.

In the example, non-limiting graph 600 depicted in FIG. 6, plot 606 illustrates the radiative lifetime of qubit 102 in device 100, where qubit 102 is filtered using: readout resonator 106 comprising a single $\lambda/2$ readout resonator (e.g., a $\lambda/2$ readout cavity) having an operating frequency (e.g., resonant frequency) of 7.5 GHz; bandpass filter 108 comprising a $\lambda/4$ bandpass filter also having an operating frequency of 7.5 GHz; and bandstop filter 114 comprising a single $\lambda/4$ bandstop filter having an operating frequency of approximately 5 GHz. In some embodiments, device 100 can comprise multiple bandstop filters 114 comprising multiple $\lambda/4$ bandstop filters that can provide additional suppression or broaden suppression bandwidth.

As illustrated by plot 606 in the example, non-limiting graph 600 depicted in FIG. 6, between approximately 4.8 GHz and approximately 5.4 GHz, device 100 provides improved radiative relaxation time (e.g., Purcell relaxation time) associated with qubit 102 when compared to plot 604 and plot 606 respectively corresponding to the first and second prior art devices described above. Therefore, device 100 can thereby facilitate increased radiative lifetime of and/or increased protection of qubit 102 between approximately 4.8 GHz and approximately 5.4 GHz while maintaining the same readout time that can be yielded by the first and/or second prior art devices described above.

Figure 7:
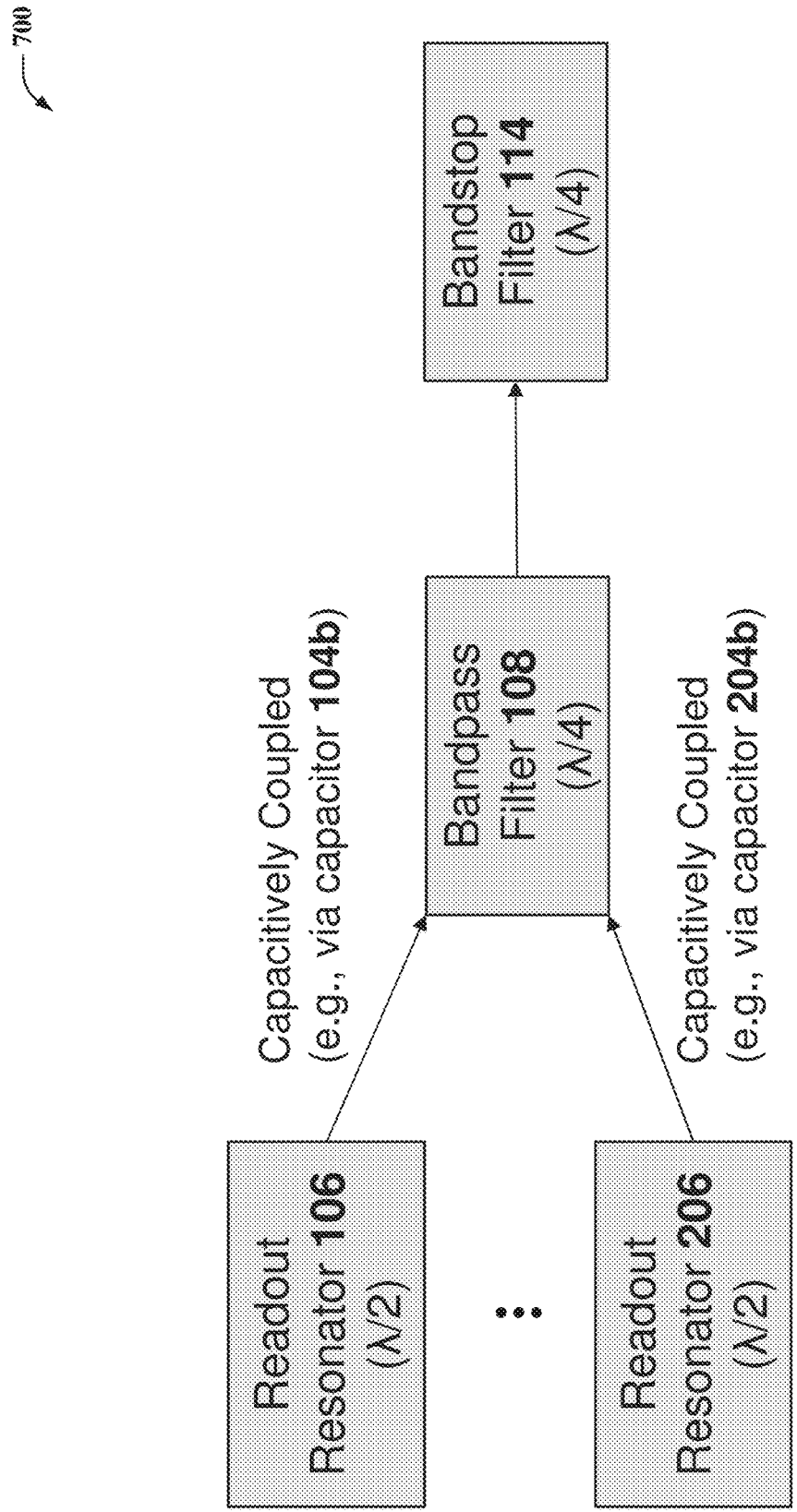
FIG. 7 illustrates an example, non-limiting diagram that can facilitate a multipole filter on a quantum device with multiplexing capability and signal separation to mitigate crosstalk in accordance with one or more embodiments described herein.

FIG. 7 illustrates an example, non-limiting diagram 700 that can facilitate a multipole filter on a quantum device with multiplexing capability and signal separation to mitigate crosstalk in accordance with one or more embodiments described herein. Repetitive description of like elements and/or processes employed in respective embodiments is omitted for sake of brevity.

Diagram 700 illustrates a coupling configuration of one or more readout resonators, a bandpass filter, and/or one or more bandstop filters that one or more embodiments of the subject disclosure can comprise. For example, device 300 described above with reference to FIG. 3 can comprise the components and the coupling configuration illustrated in diagram 700.

In some embodiments, device 300 can comprise readout resonator 106 and readout resonator 206 that can be capacitively coupled in parallel to bandpass filter 108, where such capacitive coupling is represented as capacitor 104b and capacitor 204b, respectively. In these embodiments, as denoted in the example, non-limiting diagram 700 depicted in FIG. 7, readout resonator 106 and readout resonator 206 can each comprise a λ/2 readout resonator. In these embodiments, as denoted in the example, non-limiting diagram 700 depicted in FIG. 7, bandpass filter 108 can be further coupled to bandstop filter 114, where bandpass filter 108 can comprise a single λ/4 bandpass filter and bandstop filter 114 can comprise a single λ/4 bandstop filter.

In some embodiments, device 300 and/or diagram 700 can comprise multiple bandstop filters 114 (not illustrated in FIG. 7) comprising multiple λ/4 bandstop filters that can provide additional suppression or broaden suppression bandwidth, where each of such multiple λ/4 bandstop filters can be resonant at one or more desired qubit frequencies (e.g., resonant at an operating frequency of qubit 102 and/or qubit 202). In some embodiments, device 300 and/or diagram 700 can comprise bandpass filter 108 comprising a single λ/2 bandpass filter. In some embodiments, device 300 and/or diagram 700 can comprise lumped element equivalents that can replace any or all of readout resonator 106 (e.g., λ/2 readout resonator), readout resonator 206 (e.g., λ/2 readout resonator), bandpass filter 108 (e.g., λ/4 bandpass filter), and/or bandstop filter 114 (e.g., λ/4 bandstop filter).

The various embodiments of the subject disclosure described herein (e.g., device 100, device 200, device 300, device 400, etc.) can be associated with various technologies. For example, the various embodiments of the subject disclosure described herein (e.g., device 100, device 200, device 300, device 400, etc.) can be associated with quantum computing technologies, quantum gate technologies, quantum cross-resonance gate operation technologies, quantum coupler technologies, quantum device fabrication technologies, quantum hardware and/or software technologies, quantum circuit technologies, superconducting circuit technologies, machine learning technologies, artificial intelligence technologies, cloud computing technologies, and/or other technologies.

The various embodiments of the subject disclosure described herein (e.g., device 100, device 200, device 300, device 400, etc.) can provide technical improvements to systems, devices, components, operational steps, and/or processing steps associated with the various technologies identified above. For example, the various embodiments of the subject disclosure described herein (e.g., device 100, device 200, device 300, device 400, etc.) can couple a readout resonator (e.g., readout resonator 106, readout resonator 206, etc.) to a drive line (e.g., high power drive line 306a, high power drive line 306b, etc.) formed on an interposer substrate (e.g., interposer substrate 402); and/or couple at least one of a qubit (e.g., qubit 102, qubit 202, etc.) or a multipole filter (e.g., the above described multipole filter that can comprise bandpass filter 108 and bandstop filter 114) to a readout line (e.g., readout line 310) formed on the interposer substrate. In this example, such coupling of such components can thereby provide a defined spatial separation (e.g., a relatively large spatial separation) between at least one of the drive line (e.g., high power drive line 306a, high power drive line 306b, etc.) and the readout resonator (e.g., readout resonator 106, readout resonator 206, etc.) or the drive line and the qubit (e.g., qubit 102, qubit 202, etc.) to mitigate crosstalk associated with a device (e.g., device 100, device 200, device 300, device 400, etc.) comprising the above described components.

In the above example, based on such coupling of such various components described above, the various embodiments of the subject disclosure described herein (e.g., device 100, device 200, device 300, device 400, etc.) can thereby increase the radiative lifetime of and/or protection of such a qubit (e.g., increase relaxation time, Purcell relaxation time, radiative lifetime, and/or protection of qubit 102 and/or qubit 202). In the above example, based on such coupling of such components described above, the various embodiments of the subject disclosure described herein (e.g., device 100, device 200, device 300, device 400, etc.) can further mitigate crosstalk associated with the qubit chip substrate (e.g., qubit chip substrate 404) and the interposer substrate, thereby facilitating at least one of improved accuracy, improved performance, or improved fidelity of a processing unit (e.g., a quantum processor) comprising the qubit chip substrate and the interposer substrate (e.g., a quantum processor comprising device 100, device 200, device 300, device 400, etc.).

The various embodiments of the subject disclosure described herein (e.g., device 100, device 200, device 300, device 400, etc.) can provide technical improvements to a processing unit (e.g., a quantum processor comprising device 100, device 200, device 300, and/or device 400). For example, by increasing the radiative lifetime and/or protection of such a qubit (e.g., qubit 102, qubit 202, etc.) and/or by mitigating crosstalk associated with the qubit chip substrate and the interposer substrate as described above, the various embodiments of the subject disclosure described herein (e.g., device 100, device 200, device 300, device 400, etc.) can thereby facilitate at least one of improved accuracy, improved performance, or improved fidelity of a processing unit (e.g., a quantum processor) comprising the qubit chip substrate and the interposer substrate (e.g., a quantum processor comprising device 100, device 200, device 300, device 400, etc.).

Based on such increased qubit radiative lifetime, increased qubit protection, and/or mitigation of crosstalk as described above, a practical application of the various embodiments of the subject disclosure described herein (e.g., device 100, device 200, device 300, device 400, etc.) is that they can be implemented in a quantum device (e.g., a quantum processor, a quantum computer, etc.) to more quickly and more efficiently compute, with improved fidelity and/or accuracy, one or more solutions (e.g., heuristic(s), etc.) to a variety of problems ranging in complexity (e.g., an estimation problem, an optimization problem, etc.) in a variety of domains (e.g., finance, chemistry, medicine, etc.). For example, based on such increased qubit radiative lifetime, increased qubit protection, and/or mitigation of crosstalk as described above, a practical application of the various embodiments of the subject disclosure described herein (e.g., device 100, device 200, device 300, device 400, etc.) is that they can be implemented in, for instance, a quantum processor to compute, with improved fidelity and/or accuracy, one or more solutions (e.g., heuristic(s), etc.) to an optimization problem in the domain of chemistry, medicine, and/or finance, where such a solution can be used to engineer, for instance, a new chemical compound, a new medication, and/or a new options pricing system and/or method.

It should be appreciated that the various embodiments of the subject disclosure described herein (e.g., device 100, device 200, device 300, device 400, etc.) provide a new approach driven by relatively new quantum computing technologies. For example, the various embodiments of the subject disclosure described herein (e.g., device 100, device 200, device 300, device 400, etc.) provide a new approach to increasing the radiative lifetime and/or protection of a qubit and/or to mitigating crosstalk as described above that results in quantum gate errors during quantum computations. In this example, such a new approach to increasing the radiative lifetime and/or protection of a qubit and/or to mitigating such crosstalk can enable faster and more efficient quantum computations with improved fidelity and/or accuracy using a quantum processor comprising one or more of the various embodiments of the subject disclosure described herein (e.g., device 100, device 200, device 300, device 400, etc.).

The various embodiments of the subject disclosure described herein (e.g., device 100, device 200, device 300, device 400, etc.) can employ hardware and/or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. The various embodiments of the subject disclosure described herein (e.g., device 100, device 200, device 300, device 400, etc.) can be employed to solve new problems that arise through advancements in technologies mentioned above, employment of quantum computing systems, cloud computing systems, computer architecture, and/or another technology.

It is to be appreciated that the various embodiments of the subject disclosure described herein (e.g., device 100, device 200, device 300, device 400, etc.) can utilize various combinations of electrical components, mechanical components, and circuitry that cannot be replicated in the mind of a human or performed by a human, as the various operations that can be executed by the various embodiments of the subject disclosure described herein (e.g., device 100, device 200, device 300, device 400, etc.) are operations that are greater than the capability of a human mind. For instance, the amount of data processed, the speed of processing such data, or the types of data processed by the various embodiments of the subject disclosure described herein (e.g., device 100, device 200, device 300, device 400, etc.) over a certain period of time can be greater, faster, or different than the amount, speed, or data type that can be processed by a human mind over the same period of time.

According to several embodiments, the various embodiments of the subject disclosure described herein (e.g., device 100, device 200, device 300, device 400, etc.) can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that the various embodiments of the subject disclosure described herein (e.g., device 100, device 200, device 300, device 400, etc.) can include information that is impossible to obtain manually by an entity, such as a human user. For example, the type, amount, and/or variety of information included in the various embodiments of the subject disclosure described herein (e.g., device 100, device 200, device 300, device 400, etc.) can be more complex than information obtained manually by a human user.

Figure 8:
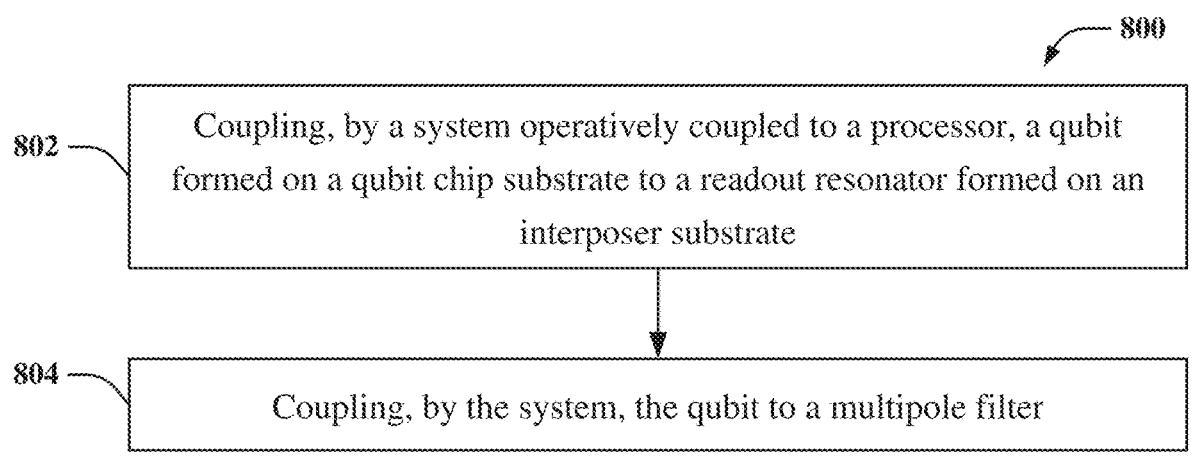
FIGS. 8 and 9 illustrate flow diagrams of example, non-limiting computer-implemented methods that can facilitate a multipole filter on a quantum device with multiplexing capability and signal separation to mitigate crosstalk in accordance with one or more embodiments described herein.

FIG. 8 illustrates a flow diagram of an example, non-limiting computer-implemented method 800 that can facilitate a multipole filter on a quantum device with multiplexing capability and signal separation to mitigate crosstalk in accordance with one or more embodiments described herein. Repetitive description of like elements and/or processes employed in respective embodiments is omitted for sake of brevity.

At 802, computer-implemented method 800 can comprise coupling, by a system (e.g., a system comprising, for instance, device 100 coupled to an AWG, a VNA, and/or a maser that can be coupled to computer 1012) operatively coupled to a processor (e.g., processing unit 1014, etc.), a qubit (e.g., qubit 102, qubit 202, etc.) formed on a qubit chip substrate (e.g., qubit chip substrate 404) to a readout resonator (e.g., readout resonator 106, readout resonator 206, etc.) formed on an interposer substrate (e.g., interposer substrate 402).

At 804, computer-implemented method 800 can comprise coupling, by the system (e.g., a system comprising, for instance, device 100 coupled to an AWG, a VNA, and/or a maser that can be coupled to computer 1012), the qubit to a multipole filter (e.g., to the multipole filter described above with reference to FIG. 1 that can comprise bandpass filter 108 and at least one bandstop filter 114).

Figure 9:
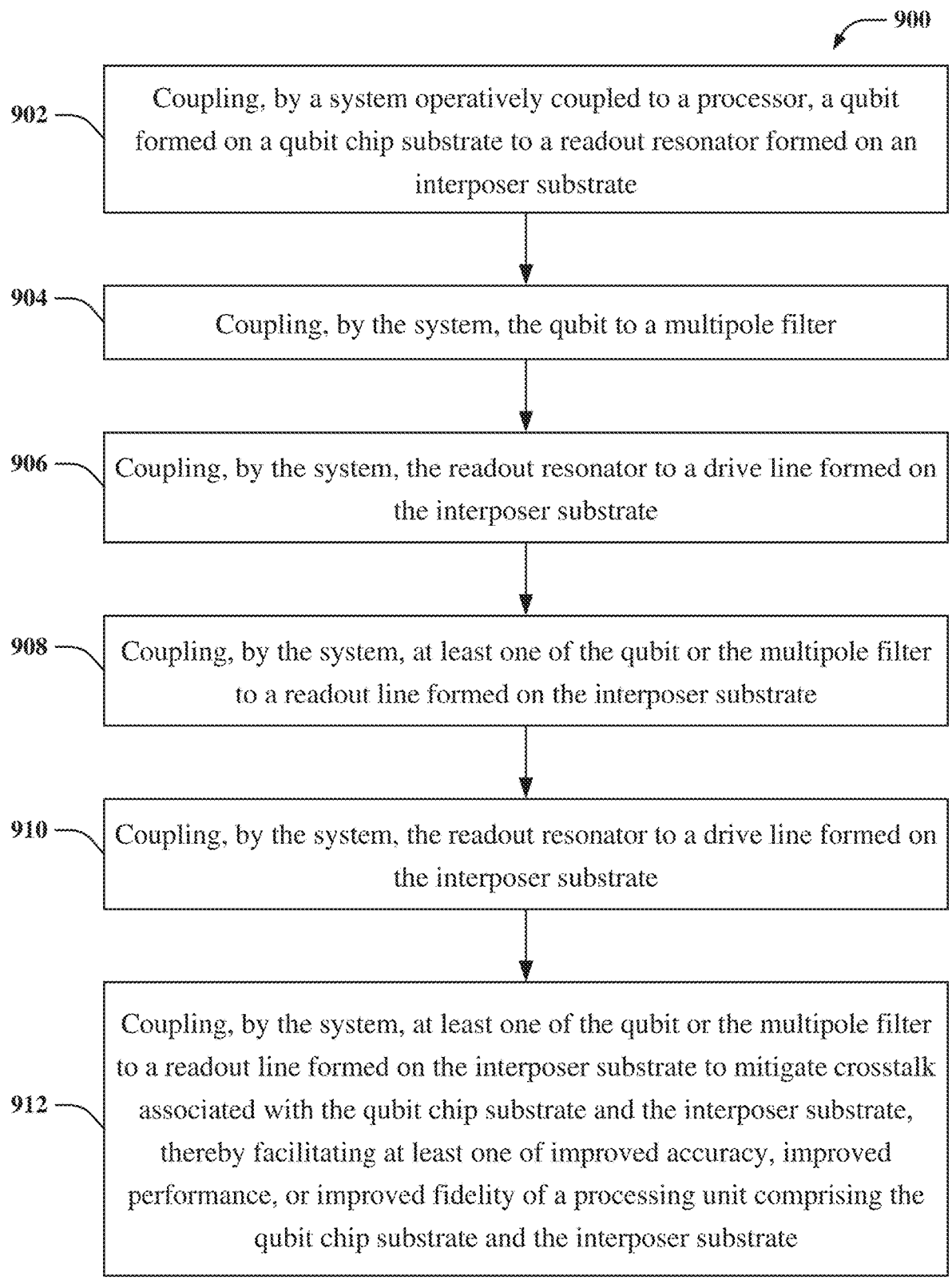

FIG. 9 illustrates a flow diagram of an example, non-limiting computer-implemented method 900 that can facilitate a multipole filter on a quantum device with multiplexing capability and signal separation to mitigate crosstalk in accordance with one or more embodiments described herein. Repetitive description of like elements and/or processes employed in respective embodiments is omitted for sake of brevity.

At 902, computer-implemented method 900 can comprise coupling, by a system (e.g., a system comprising, for instance, device 100 coupled to an AWG, a VNA, and/or a maser that can be coupled to computer 1012) operatively coupled to a processor (e.g., processing unit 1014, etc.), a qubit (e.g., qubit 102, qubit 202, etc.) formed on a qubit chip substrate (e.g., qubit chip substrate 404) to a readout resonator (e.g., readout resonator 106, readout resonator 206, etc.) formed on an interposer substrate (e.g., interposer substrate 402).

At 904, computer-implemented method 900 can comprise coupling, by the system (e.g., a system comprising, for instance, device 100 coupled to an AWG, a VNA, and/or a maser that can be coupled to computer 1012), the qubit to a multipole filter (e.g., to the multipole filter described above with reference to FIG. 1 that can comprise bandpass filter 108 and at least one bandstop filter 114).

At 906, computer-implemented method 900 can comprise coupling, by the system (e.g., a system comprising, for instance, device 100 coupled to an AWG, a VNA, and/or a maser that can be coupled to computer 1012), the readout resonator to a drive line (e.g., high power drive line 306a, high power drive line 306b, etc.) formed on the interposer substrate.

At 908, computer-implemented method 900 can comprise coupling, by the system (e.g., a system comprising, for instance, device 100 coupled to an AWG, a VNA, and/or a maser that can be coupled to computer 1012), at least one of the qubit or the multipole filter to a readout line (e.g., readout line 310) formed on the interposer substrate.

At 910, computer-implemented method 900 can comprise coupling, by the system (e.g., a system comprising, for instance, device 100 coupled to an AWG, a VNA, and/or a maser that can be coupled to computer 1012), the readout resonator to a drive line (e.g., high power drive line 306a, high power drive line 306b, etc.) formed on the interposer substrate.

At 912, computer-implemented method 900 can comprise coupling, by the system (e.g., a system comprising, for instance, device 100 coupled to an AWG, a VNA, and/or a maser that can be coupled to computer 1012), at least one of the qubit or the multipole filter to a readout line (e.g., readout line 310) formed on the interposer substrate to mitigate crosstalk associated with the qubit chip substrate and the interposer substrate, thereby facilitating at least one of improved accuracy, improved performance, or improved fidelity of a processing unit (e.g., a quantum processor) comprising the qubit chip substrate and the interposer substrate.

Figure 10:
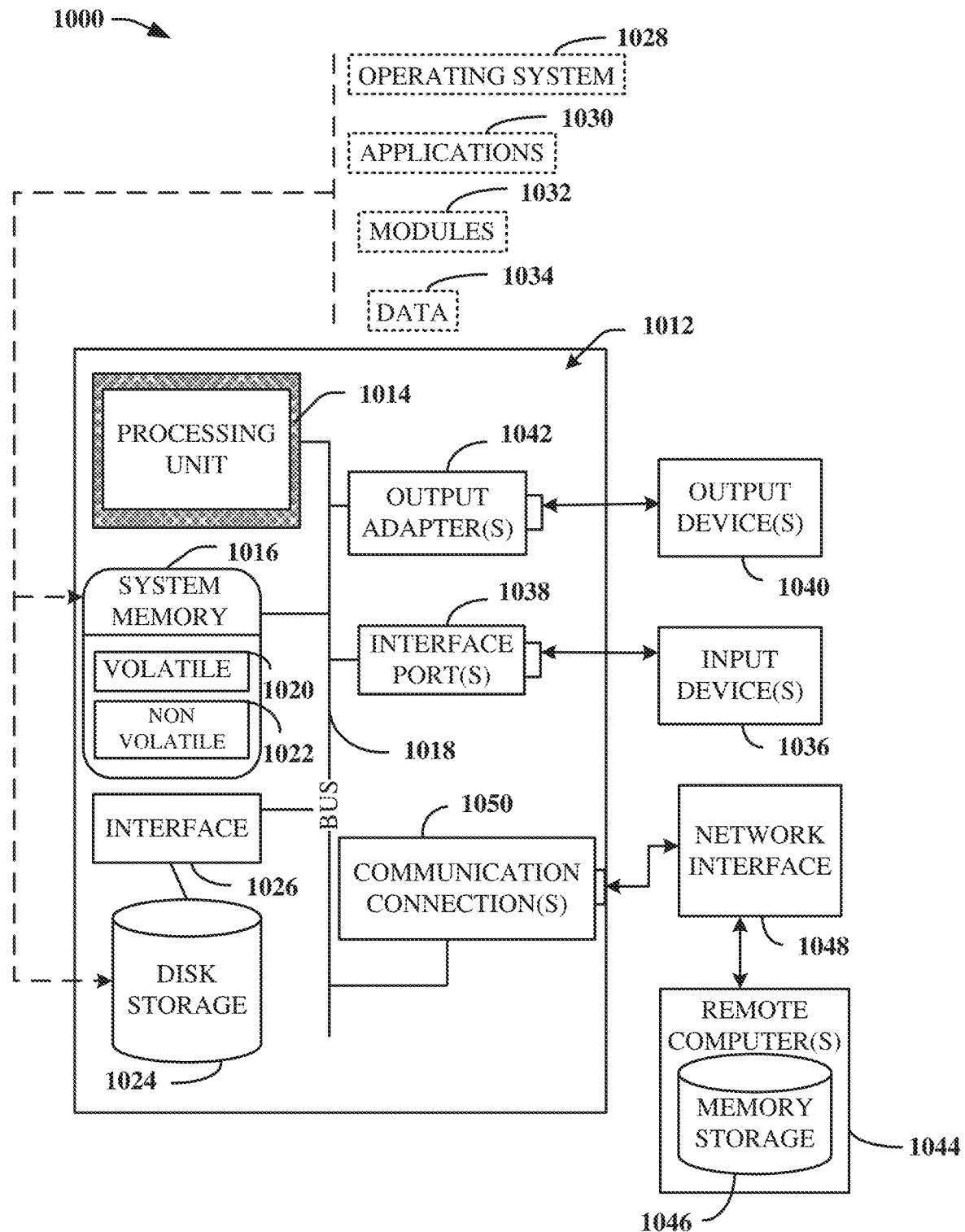
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. For example, as described below, operating environment 1000 can be used to implement the example, non-limiting multi-step fabrication sequences described above with reference to FIGS. 1, 2, 3, and 4 that can be implemented to fabricate device 100, device 200, device 300, and/or device 400 in accordance with one or more embodiments of the subject disclosure as described herein. In another example, as described below, operating environment 1000 can be used to implement one or more of the example, non-limiting computer-implemented methods 800 and/or 900 described above with reference to FIGS. 8 and 9, respectively. Repetitive description of like elements and/or processes employed in other embodiments described herein is omitted for sake of brevity.

The example, non-limiting multi-step fabrication sequences described above with reference to FIGS. 1, 2, 3, and 4, which can be implemented to fabricate device 100, device 200, device 300, and/or device 400, can be implemented by a computing system (e.g., operating environment 1000 illustrated in FIG. 10 and described below) and/or a computing device (e.g., computer 1012 illustrated in FIG. 10 and described below). In non-limiting example embodiments, such a computing system (e.g., operating environment 1000) and/or such a computing device (e.g., computer 1012) can comprise one or more processors and one or more memory devices that can store executable instructions thereon that, when executed by the one or more processors, can facilitate performance of the example, non-limiting multi-step fabrication sequences described above with reference to FIGS. 1, 2, 3, and 4. As a non-limiting example, the one or more processors can facilitate performance of the example, non-limiting multi-step fabrication sequences described above with reference to FIGS. 1, 2, 3, and 4 by directing and/or controlling one or more systems and/or equipment operable to perform semiconductor and/or superconductor device fabrication.

In another example, one or more of the example, non-limiting computer-implemented methods 800 and/or 900 described above with reference to FIGS. 8 and 9, respectively, can also be implemented (e.g., executed) by operating environment 1000. As a non-limiting example, the one or more processors of such a computing device (e.g., computer 1012) can facilitate performance of one or more of the example, non-limiting computer implemented methods 800 and/or 900 described above with reference to FIGS. 8 and 9, respectively, by directing and/or controlling one or more systems and/or equipment (e.g., one or more types of the external device defined herein such as, for instance, an AWG, a VNA, a maser, etc.) operable to perform the operations and/or routines of such computer-implemented method(s).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
an interposer substrate comprising a readout resonator coupled to a drive line formed on the interposer substrate via a first capacitor; and
a qubit chip substrate comprising:
a qubit coupled to the readout resonator; and
a multipole filter comprising:
a bandpass filter coupled to a readout line formed on the interposer substrate, and coupled to the readout resonator via a second capacitor; and
a bandstop filter coupled to the bandpass filter, and coupled to ground via a third capacitor.

2. The device of claim 1, wherein the qubit is coupled to the readout resonator via a fourth capacitor.

3. The device of claim 2, wherein the bandpass filter operates at an operating frequency of the readout resonator, and the bandstop filter operates at an operating frequency of the qubit.

4. The device of claim 3, wherein the readout resonator is a first readout resonator, the qubit is a first qubit, the bandstop filter is a first bandstop filter, and the drive line is a first drive line, and wherein:
the interposer substrate further comprises a second readout resonator coupled to a second drive line formed on the interposer substrate via a fifth capacitor,
the qubit chip substrate further comprises a second qubit coupled to the second readout resonator via a sixth capacitor, and
the multipole filter further comprises a second bandstop filter coupled to ground via a seventh capacitor.

5. The device of claim 4, wherein:
the operating frequency of the readout resonator is higher than respective operating frequencies of the first qubit and the second qubit, and
the second bandstop filter operates at an operating frequency of the second qubit.

6. The device of claim 2, wherein the operating frequency of the readout resonator operates is higher than an operating frequency of the qubit.

7. The device of claim 4, wherein:
the first qubit is capacitively coupled to the second qubit.

8. A device, comprising:
an interposer substrate comprising readout resonators, wherein the readout resonators are coupled to respective drive lines formed on the interposer substrate via respective first capacitors; and
a qubit chip substrate comprising:
qubits respectively coupled to the readout resonators; and a multipole filter comprising:
- a bandpass filter coupled to a readout line formed on the interposer substrate, and coupled to the readout resonators via respective second capacitors; and
- respective bandstop filters associated with the readout resonators, wherein the respective bandstop filters are coupled to the bandpass filter, and coupled to ground via respective third capacitors.

9. The device of claim 8, wherein the qubits are respectively coupled to the readout resonators via respective fourth capacitors.

10. The device of claim 9, wherein the bandpass filter operates at an operating frequency of at least one of the readout resonators, and the bandstop filters respectively operate at respective operating frequencies of corresponding qubits of the qubits.

11. The device of claim 8, wherein at least two of the qubits are capacitively coupled together.

12. The device of claim 8, wherein respective operating frequencies of the readout resonators are higher than respective operating frequencies of the qubits.

13. The device of claim 8, wherein the bandpass filter operates at an operating frequency of at least 7.5 GHz.

14. A circuit, comprising:
- a readout resonator coupled to a drive line via a first capacitor;
- a qubit coupled to the readout resonator;
- a bandpass filter coupled to a readout line, and coupled to the readout resonator via a second capacitor; and
- a bandstop filter coupled to the bandpass filter, and coupled to ground via a third capacitor.

15. The circuit of claim 14, wherein the qubit is coupled to the readout resonator via a fourth capacitor.

16. The circuit of claim 15, wherein the bandpass filter operates at an operating frequency of the readout resonator, and the bandstop filter operates at an operating frequency of the qubit.

17. The circuit of claim 16, wherein the readout resonator is a first readout resonator, the qubit is a first qubit, the bandstop filter is a first bandstop filter, and the drive line is a first drive line, and wherein the circuit further comprises:
- a second readout resonator coupled to a second drive line via a fifth capacitor;
- a second qubit coupled to the second readout resonator via a sixth capacitor, and
- a second bandstop filter coupled to ground via a seventh capacitor.

18. The circuit of claim 17, wherein:
- the operating frequency of the readout resonator is higher than respective operating frequencies of the first qubit and the second qubit; and
- the second bandstop filter operates at an operating frequency of the second qubit.

19. The circuit of claim 17, wherein:
- the first qubit is capacitively coupled to the second qubit.

20. The circuit of claim 15, wherein the operating frequency of the readout resonator is higher than an operating frequency of the qubit.

* * * * *